United States Patent [19]
Moon et al.

[11] Patent Number: 5,420,730
[45] Date of Patent: May 30, 1995

[54] SERVO DATA RECOVERY CIRCUIT FOR DISK DRIVE HAVING DIGITAL EMBEDDED SECTOR SERVO

[76] Inventors: Ronald R. Moon, 815 E. 12100 N., Lewiston, Utah 84320; Daniel E. Barnard, 3653 Summit Ridge Ct., San Jose, Calif. 95148

[21] Appl. No.: 180,096

[22] Filed: Jan. 11, 1994

Related U.S. Application Data

[63] Continuation of Ser. No. 710,172, Jun. 4, 1991, abandoned, which is a continuation-in-part of Ser. No. 569,065, Aug. 17, 1990, Pat. No. 5,170,299.

[51] Int. Cl.$^6$ ............................................. G11B 5/596
[52] U.S. Cl. ................... 360/77.08; 360/78.14; 360/51
[58] Field of Search ............. 360/77.08, 78.14, 48, 360/40, 51, 49, 38.1

[56] References Cited

U.S. PATENT DOCUMENTS

| | | | |
|---|---|---|---|
| 4,424,543 | 1/1984 | Lewis et al. | 360/135 |
| 4,424,543 | 1/1984 | Lewis et al. | 360/135 |
| 4,618,898 | 10/1986 | Young et al. | 360/39 X |
| 4,663,752 | 5/1987 | Kakuse et al. | 360/38.1 X |
| 4,669,004 | 5/1987 | Moon et al. | 360/77.08 X |
| 4,737,869 | 4/1988 | Sugaya et al. | 360/77 |
| 4,746,997 | 5/1988 | Shrinkle et al. | 360/48 X |
| 4,788,605 | 11/1988 | Spiesman et al. | 360/51 X |
| 4,823,212 | 4/1989 | Knowles et al. | 360/77.08 |
| 4,876,697 | 10/1989 | Whitfield | 360/40 X |
| 4,910,617 | 3/1990 | Brunnett et al. | 360/78.14 |
| 4,933,795 | 6/1990 | Nigam | 360/121 |
| 5,036,408 | 7/1991 | Leis et al. | 360/48 |
| 5,062,011 | 10/1991 | Hase et al. | 360/40 |
| 5,121,280 | 6/1992 | King | 360/73.03 X |
| 5,210,660 | 5/1993 | Hetzler | 360/48 X |

FOREIGN PATENT DOCUMENTS

| | | | |
|---|---|---|---|
| 0088554 | 9/1983 | European Pat. Off. | G11B 5/58 |
| 0262690 | 4/1988 | European Pat. Off. | G11B 5/55 |
| 0471314 | 2/1992 | European Pat. Off. | G11B 5/596 |

*Primary Examiner*—Aristotelis Psitos
*Assistant Examiner*—James T. Wilson
*Attorney, Agent, or Firm*—David B. Harrison

[57] ABSTRACT

A method and apparatus are provided for recovering servo information in a disk drive for positioning a data transducer head relative to concentric data tracks wherein the head reads user data encoded in a predetermined data code and reads servo information within plural servo sectors embedded in each data track defined on a storage surface of a rotating disk. The data tracks are arranged in plural groups of concentric tracks within concentric zones wherein each zone has a user data transfer rate selected in relation to disk radius, the servo information being recorded in at least three patterns within each embedded servo sector: a servo sync pattern, a user data code violating pattern, and a servo data bit pattern. A servo data recovery circuit implements the method comprising the steps of:

timing expected arrival of a servo sector with a sector timer, at the expected arrival of the servo sector detecting a said servo sync pattern with a servo sync pattern detector, detecting at least one said user data code violating pattern with a user data code violating pattern detector, detecting recurrent servo data bit patterns as binary data bits with a data reader, determining presence of a servo address mark with a master state machine following detection of said at least one user data code violating pattern, upon detection of a servo address mark, restarting said sector timer, accumulating within the master state machine the detected binary data bits in order to detect a track identification number, and providing the track identification number to a head position servo loop for use in positioning the head relative to the data tracks during track seeking operations of the disk drive. The data reader forms an independent aspect of the present invention.

21 Claims, 13 Drawing Sheets

FIG.-2

| | TRK-1 | TRK-0 | TRK-1 | TRK-2 | |
|---|---|---|---|---|---|
| 0000 0000 00 (10 code 0's) dc erase | | | | | 10T 0.625us 62 |
| 100100100100100100100100100100100100 3T pattern (100) repeated 12 times | C BURST | | C BURST | C BURST | 36T 2.25us 60 |
| 0000 0000 (8 code 0's) de erase | | | | | 8T 0.5us |
| 100100100100100100100100100100100100 3T pattern (100) repeated 12 times | | B BURST | | B BURST | 36T 2.25us 53 / 56 |
| 0000 0000 (8 code 0's) de erase | | | | | 8T 0.5us |
| 100100100100100100100100100100100100 3T pattern (100) repeated 12 times | | A BURST | A BURST | | 36T 2.25us 54 / 52 |
| 0000 0000 (8 code 0's) de erase | | | | | 8T 0.5us |
| Track number is Gray coded Gray to Binary is Gmsb=Bmsb and Gn=Bn xor Bn+1. To convert from Gray to disk coding use the following: Gray "0"=disk 10 000 010 0 Gray "1"=disk 10 010 000 0 Example: Binary trk no. 00AH= Gray trk no. 00FH= 10 000 0100 10 000 0100 10 000 010 0 10 000 0100 10 000 0100 10 000 010 0 10 000 0100 10 000 0100 10 010 000 0 10 010 0000 10 010 0000 10 010 000 0 | TRACK NUMBER 12 BITS BINARY TRACK NO. 00DH GRAY TRACK NO. 009H | TRACK NUMBER 12 BITS BINARY TRACK NO. 00FH GRAY TRACK NO. 00AH | TRACK NUMBER 12 BITS BINARY TRACK NO. 00EH GRAY TRACK NO. 00BH | TRACK NUMBER 12 BITS BINARY TRACK NO. 00AH GRAY TRACK NO. 00CH | 108T 6.75us 46 / 43 |
| 10 010 000 0 "1" for sec. 0 (index) 10 000 0100 "0" for sec. 1 thru 5 | INDEX BIT | INDEX BIT | INDEX BIT | INDEX BIT | 9T 0.5us |
| 10000000000000 10000000000000 Time A 10 000 010 0 14T repeated 2 times followed by a data bit "0" | SERVO ADDRESS MARK | SERVO ADDRESS MARK | SERVO ADDRESS MARK | SERVO ADDRESS MARK | 37T 2.31us 44 |
| 100100100100100100 A 3T (100) pattern repeated 6 times | SERVO SYNC | SERVO SYNC | SERVO SYNC | SERVO SYNC | 18T 1.13us 42 |
| 100100100100100100100100100100100100 100100100100100100100100100100100100 A 3T (100) pattern repeated 24 times | AGC TIME | AGC TIME | AGC TIME | AGC TIME | 72T 4.5us 40 |

Assumes T=62.5ns (16MHz)

386T=24.125us

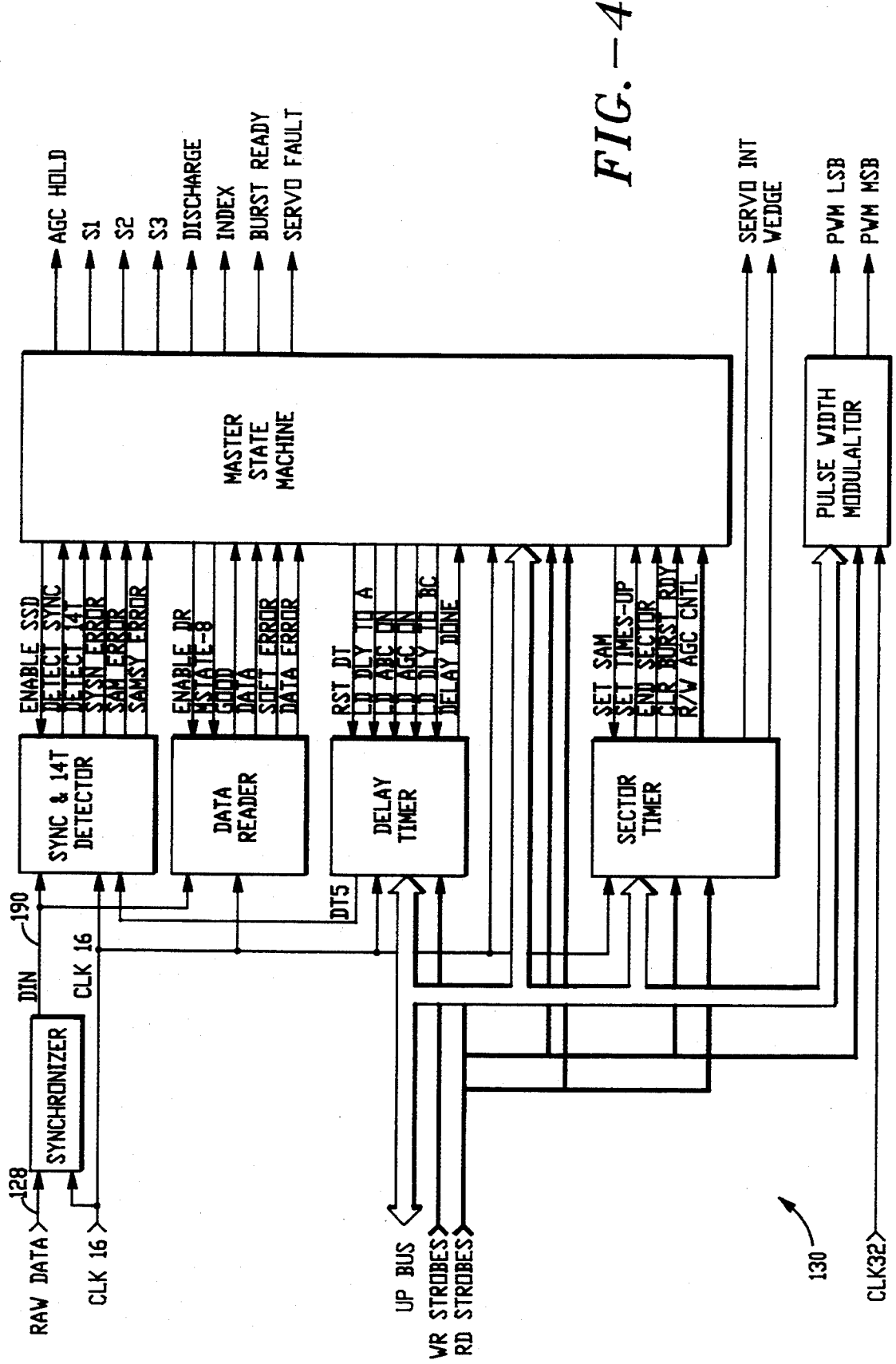

SERVO DATA RECOVERY CIRCUIT FOR DISK DRIVE HAVING DIGITAL EMBEDDED SECTOR SERVO

REFERENCE TO RELATED APPLICATION

This is a continuation of U.S. patent application Ser. No. 07/710,172, filed on Jun. 4, 1991, now abandoned, which is a continuation-in-part of U.S. patent application Ser. No. 07/560,065, filed on Aug. 17, 1990, now U.S. Pat. No. 5,170,299.

REFERENCE TO MICROFICHE APPENDIX

Reference is made to a microfiche appendix accompanying this patent application containing microcontroller routine program listings and detailed schematic circuit diagrams of elements of a disk drive and servo data recovery circuit embodying principles of the present invention.

FIELD OF THE INVENTION

The present invention relates to digital data acquisition and control systems. More specifically, the present invention relates to apparatus and methods for recovering embedded analog sector servo information for a head positioning digital servo system within a disk drive data storage subsystem.

BACKGROUND OF THE INVENTION

Disk drives typically include a data storage disk which is rotated relative to a base at a controlled velocity. A fixed data transducer head assembly is typically radially positionable relative to concentric data tracks formed on a storage surface of the disk. It is common to find disk drives with a single disk which may be removable, as in the case of a fixed, floppy or cartridge hard disk drive or multiple disks mounted to a common spindle as is commonly found in fixed disk drives. With disk drives employing positionable heads, it is axiomatic that a control mechanism must be employed in order to move the head from a departure track to a destination track during track seeking operations, and to maintain the head in registration with a track during track following operations when user data is being written to the disk or read from the disk.

Head position control systems for disk drives have followed many forms. One form employed in low track density disk drives has been a so-called open loop servo positioner employing a detent-providing stepper motor. In order to access a particular track location, a controller issues step pulse signals to the step motor and its armature rotates accordingly, with a unit increment of rotation occurring with each step pulse control signal. This incremental rotation is then applied to rotate a rotary head positioner, or it is converted into rectilinear motion for moving a linear head positioner. Since the step motor remains at a stable position between steps, this characteristic has been relied upon to ensure stability of the head positioner during track following. Open loop servo positioners have most frequently been employed in floppy disk drives, and have also been employed in some low cost, limited capacity fixed disk drives, such as the Shugart Associates' SA1000 eight inch fixed disk drive, and the Seagate Technology ST-506 and ST-412 five and one quarter inch disk drives. A three and one half inch disk diameter, stepper motor positioned disk drive is described in U.S. Pat. No. 5,568,988, for example.

A drawback of the open loop servo head positioner is that without any head position feedback information, the concentric data tracks must be spaced sufficiently apart in order to accommodate tolerances, such as those resulting from thermal expansion and contraction of mechanical components, occurring within the disk drive during operation.

A second approach has been to dedicate an entire data storage surface of a disk drive to head position servo information. With this approach, a pattern of concentric servo tracks is written very precisely with a servo writer apparatus. The disk drive is then Equipped with a servo head which is mounted for common movement with the data transducer heads by a head arm assembly. A servo read-only channel connected with the servo head operates within a closed loop head position servo system. These systems have been primarily analog in nature. During track seeking and track following, phase coherent analog servo patterns recorded within the servo tracks are read by the servo head and thereby provide actual position information used by the closed loop servo to correct the head position to either a desired trajectory during seeking or to track centerline alignment during following.

One drawback of the servo surface approach is that an entire data storage surface of the disk drive is required for servo information overhead and is therefore unavailable for the primary task of storing user information. Also a separate servo head and read channel are required with this implementation. While track densities can be very high, the servo surface approach, typically employing multiple disks on the spindle, is generally viewed as a high cost approach. One other potential drawback is that over thermal operating cycles or after mechanical shocks, a positional discrepancy may develop between data recorded on a track of a disk other than the disk containing the servo pattern and the corresponding servo track provided for nominal centerline registration of the stack of servo and data transducers forming the single head arm assembly. Yet another drawback with analog servo systems is their susceptibility to noise and other interferences, which may limit their performance, or which may limit yields in mass production.

A head position system which may be realized at lower cost than the dedicated closed loop servo but which does not require the cost overhead of the dedicated servo surface and dedicated servo transducer and servo read channel, is realized with a head positioner transducer, such as a polyphase optical encoder having a scale tightly coupled to the head arm assembly. The heads are then positioned on the basis of position information fed back to the servo control loop from the position transducer. Unfortunately, system tolerances and shifts, typically due to thermal changes, inertia, reticle to scale gap shifts, etc., cause the optical encoder to lose calibration with actual head position.

One way of correcting for tolerances of the disk drive arising e.g. from thermal shifts, or otherwise, is to embed prerecorded servo information on one or more of the data storage surfaces, and to retrieve this embedded servo information periodically and use it as a position correction vernier in order to correct the position of the head transducers relative to the data track location. This correction information may be embedded as a single servo sector located at a raw index marker, as was done in the commonly assigned U.S. Pat. No. 4,396,959, now U.S. Reissue Pat. No. RE32,075 in the case of the polyphase optical encoder positioner based servo control loop. Or, the information may be embedded as one or more servo sectors and used in combination with a servo surface, as was done by IBM in its 62 PC eight inch disk drive known as the "Piccolo". see Robert D. Commander et al., "Servo Design for an Eight-Inch Disk File", *IBM Disk Storage Technology.* February 1980, pp. 90–98; also see IBM U.S. Pat. No. 4,072,990 relating to this general approach.

Still another method for providing head position feedback information to a head positioner servo loop is to embed servo information in sufficient quantity and readable at sufficiently frequent intervals within a data storage area to provide for head position control. Such information may be of the form of dedicated tracks interspersed between data tracks, or more frequently, such information may be of the form of servo sectors which interrupt the data tracks. With this approach, the servo information is periodically sampled and held, and head position is derived from the samples. In an embedded servo sector scheme, head position resolution will depend e.g. upon the number of samples provided per revolution of the disk and the efficiency with which the servo loop can recover and process each servo sample into a head position correction value for controlling the actuator and thereby correct the position of the head arm and heads.

An exemplary disk drive employing an embedded sector digital head positioner servo loop is described in commonly assigned U.S. Pat. No. 4,669,004, the disclosure of which is hereby incorporated by reference. While the disk drive described in the '004 patent worked very well, certain improvements have subsequently been made; and, this patent represents an improvement in one aspect of the digital servo system employed in the '004 patent.

To be fully effective for its assigned task of providing actual position information, an embedded servo pattern should include information identifying the track as unique from its neighboring tracks, and the pattern should provide a centerline reference as well. The track identification number is useful during track seeking operations to indicate the radial position of the data head relative to the storage surface. To be reliable the track identification number must be in the form of full track addresses, and the track identification number must be readable not only when the data head is following the track during track following, but when the data track is not centered over the servo information but is located somewhere between the tracks, as frequently occurs during track seeking. Embedded servo sectors typically include not only track identification numbers used by the positioning servo for coarse positioning, but also fine positioning information, typically two or four radially offset servo bursts, the relative amplitudes of which are sampled and held. When servo information is embedded within data track zones having differing data transfer rates, issues relating to automatic gain control of the read channel also arise, as it is necessary to reset or normalize read channel gain when traversing a servo sector, particularly when sampling and holding fine positioning or track centering information.

One known technique to improve the robustness and reliability of the track identification number is to encode it as a Gray code. With Gray code addressing, only one bit changes as each track is progressively encountered. Thus, if a data head is located between two tracks, Gray coding of the track number will limit the track error to no more than about one half track pitch. Read channel hysteresis may create a preference for one track over another adjacent track location, such that change of track number may not occur at the equidistant boundary between the two tracks.

The problem associated with reliability of the track identification number is fairly well understood and solved in the case of disk drives practicing invariant data transfer rates, as was the case in the referenced '004 patent. However, it is also well understood that fixed data rates lead to inefficient storage of user data, since flux transition density is limited to the maximum density available at the innermost useable data track location, where relative head-disk velocity is lowest. To solve the problem of non-optimization of data transfer, variable data rates have been proposed. One known approach is to divide the storage surface into a plurality of data zones. Each zone has a data transfer rate established as the practical maximum for the radially innermost track of the zone.

When data zones are present, complications arise with regard to embedding servo information. During longer track seeking operations, the data head will change one or more zones. If the data rate of sector servo information embedded within the data tracks changes with the change in zones, a particular problem arises in decoding track identification numbers, as the servo must resynchronize virtually immediately to a new data rate associated with a particular zone. Another issue presented with zoned data transfer rates is that fixed block length data sectors will differ in circumferential length from zone to zone. If servo information is embedded at the beginning of such blocks, the servo information will not align throughout the disk surface, leading to complications in timing and sampling of the servo information. An example of a zoned data recording scheme wherein the location of embedded servo information varies with zone is to be found in the Ottesen U.S. Pat. No. 4,016,603, the disclosure of which is hereby incorporated by reference.

A hitherto unsolved need has arisen for a servo data recovery circuit for recovering the embedded servo information in a manner which is improved over the prior approaches and therefor more effective for its tasks.

SUMMARY OF THE INVENTION WITH OBJECTS

A general object of the present invention is to provide apparatus and methods for asynchronously recovering embedded analog sector servo information and converting the information into digital and control values useful for head positioning operations of a digital head position servo and for other internal operations of a disk drive in a manner which overcomes limitations and drawbacks of the prior approach.

Another general object of the present invention is to provide a highly reliable embedded sector servo data recovery method and apparatus for use within a disk drive e.g., employing split data fields and data zones to store useful data in blocks of fixed length more efficiently and optimally within concentric data tracks of the storage disk.

One more general object of the present invention is to provide a servo data recovery circuit including a master state machine for tracking plural control fields within each one of a plurality of embedded servo sectors, and which includes a plurality of slave state machines, each for tracking components of the plural control fields.

A further object of the present invention is to provide a servo data recovery circuit which operates in a highly reliable fashion in real time upon incoming analog servo data without requiring a phase locked loop for data separation and recovery.

One more object of the present invention is to provide a servo data recovery circuit and method which tolerates analog flux transition shifts occurring within the disk drive.

Yet another object of the present invention is to provide a servo data recovery circuit which may be implemented as a portion of a larger single application-specific VLSI circuit ("ASIC") for performing a number of disk drive control functions and operations.

Yet one more object of the present invention is to provide a servo data recovery circuit which implements a method for very rapid and reliable acquisition of analog servo data, so that the data recovery circuit and its method may be employed in a wide variety of embedded servo sector architectures, including those employing radially aligned, fixed data rate servo information, and those employing data zones with varying data transfer rates for both user data and servo data.

Still one more object of the present invention is to provide a unique analog servo pattern for servo sectors, and an asynchronous digital servo recovery circuit for converting the pattern into digital and control values for a digital head position control system within a disk drive.

One further object of the present invention is to realize a size compacted fixed disk drive which includes a very robust head position digital servo loop employing servo sectors embedded in the concentric data tracks, and asynchronous servo data recovery circuitry for recovering the head position information in the servo sectors and supplying the information to the servo loop.

In accordance with the present invention a method is provided for decoding plural servo flux transition patterns into control information with phase shift tolerance and without phaselock being required for decoding. The patterns represent at least servo sync, a data code violation pattern related to detection of a servo address mark and a digital pattern providing track identification number bits. The patterns are most preferably contained in phase coherent servo sectors embedded within concentric data tracks of a data storage surface of a data storage disk of a disk drive. The patterns are read as a data transducer head of the drive passes over the particular servo sector. The method of the present invention comprises the steps of:

starting operation of a master state machine at the expected occurrence of a present servo sector, decoding the sync pattern with a sync and data code violating pattern detector controlled by the master state machine, decoding the data code violation pattern with the sync and data code violating pattern detector, decoding bits, at least some of which comprise each said track identification number bit with a data reader controlled by the master state machine, determining the presence of the servo address mark by the master state machine in response at least to the step of decoding the data code violation pattern, accumulating at the master state machine the track identification number bits received from the data reader thereby to frame a track identification number, and timing an expected occurrence of a next servo sector in relation to the determined presence of the servo address mark by restarting a servo sector timer with the master state machine, and providing the track identification number to a digital head positioning servo system preferably including a programmed digital microcontroller or digital signal processor for controlling position of the head relative to the tracks within the disk drive.

As an aspect of this method, additional patterns are provided within the servo sector which include track centerline information. In one preferred form, these additional patterns are recorded as plural, radially offset servo fields. The method comprises the further step of timing occurrence of the radially offset servo fields with the master state machine to enable sampling and holding of relative amplitudes of at least some of the fields. Advantageously, the sampled and held information is useful for providing track centering information to the head position servo system.

As a further aspect of the new method a single slave state machine signals detection of the sync pattern to the master state machine, and then signals detection of the data code violating pattern to the master state machine.

As a related aspect of the new method, user data is recorded in data sectors of the data tracks in accordance with a predetermined data code, such as 1,7 RLL code, and the data code violating pattern violates the 1,7 RLL code, by including more than seven consecutive zero states following a one state. When data transfer rates are adjusted over zones, the data code violation pattern is selected to violate the data pattern for each and every data zone.

As one more aspect of the new method the data reader slave state machine recurrently examines patterns of three clock cycles ("triads") in order to decode each track identification number data bit.

As yet another aspect of the new method a further step of signalling error states to the master state machine from the slave state machines is carried out if or when an error in detecting one of the patterns has occurred.

As one more aspect of the present invention, the new method comprises the step of framing each incoming flux transition into a data pulse synchronized with an internal digital clock.

As yet another aspect of the present invention, the new method includes rapidly readjusting gain of a read channel incident to recovering the servo patterns.

The new method may alternatively be described for recovering servo data in a disk drive including a data storage disk surface defining a plurality of servo sectors embedded within data tracks wherein each servo sector includes a plurality of fields, including at least a servo sync field, a servo address mark field, and a track number field. The servo sector fields are preferably regularly aligned radially and circumferentially across the disk storage surface and the servo patterns are recorded at a single nominal clock rate (T). The disk drive includes a positionable data transducer head for reading data in the data tracks and the embedded servo sectors. A read channel converts flux transitions transduced from the storage surface into raw data pulses. A digital head positioner servo positions the data transducer head relative to each selected one of a multiplicity of concentric data tracks defined on the storage surface. The new servo data recovery method comprises the steps of:

generating a reference clock signal related to the single nominal clock rate, framing the raw data pulses within periods of the reference clock signal into digital servo data, timing recurrence of each servo sector as timed from detection of a preceding servo sector, detecting within the servo sector digital servo data patterns associated with the sync field and with the servo address mark field, detecting each one of plural data bits comprising the track number of the track number field with the aid of a data reader, and responding with a master state machine to said step of detecting patterns associated with the sync field and servo address mark field by detecting a servo address mark and thereupon resetting a servo sector timer for timing recurrence of each servo sector, accumulating each detected track number bit of said track number and providing the track number to the head positioner servo.

As an aspect of this facet of the invention, the servo sector may include a plurality of time staggered, radially offset burst fields of constant flux transition density for providing track centerline information for each data track, and the method may include the further step of timing delays associated with each said burst field with a delay timer.

Further in accordance with the present invention, an asynchronous servo data recovery circuit is provided for a disk drive including a data storage disk surface defining a plurality of servo sectors embedded within data tracks wherein each servo sector includes a plurality of fields, including at least a servo sync field, a servo address mark field, and a track number field, the servo sector fields being recorded at a single nominal clock rate, the disk drive further including a positionable data transducer head for reading data in the data tracks including the servo sector fields of the embedded servo sectors, and a read channel for converting flux transitions transduced from the storage surface into raw data pulses, and a head positioner servo for positioning the data transducer head at each selected one of a multiplicity of concentric data tracks defined on the storage surface. The servo data recovery circuit comprises:

an internal clock generator for generating a reference clock signal related to the single nominal clock rate, a raw data synchronizer responsive to the reference clock signal for receiving and framing the raw data pulses within periods of the reference clock signal into digital servo data, a sync field and data code violating pattern detector for detecting digital servo data patterns associated with the sync field and with the servo address mark field, a data reader for detecting each one of plural data bits including the track number of the track number field, a servo sector timer for timing recurrence of each servo sector as timed from detection of a preceding servo sector, a master state machine responsive to said servo sector timer for activating and responding to said sync field and data code violating pattern detector, said data reader, and said servo sector timer so as to detect a servo address mark in response to patterns detected by said sync field and data code violating pattern detector and thereupon reset said servo sector timer and so as to accumulate each track number bit of said track number detected by said data reader and to provide the track number to said head positioner servo.

As an aspect of this facet of the invention, the servo sector includes a plurality of time staggered, radially offset burst fields of repeating flux transition patterns to provide track centerline information based upon relative amplitudes read by the data transducer head and held within a switched peak detecting circuit, and the servo data recovery circuit further comprises a delay timer for timing delays associated with each said burst field, for controlling operation of the switched peak detecting circuit.

As a further aspect of this facet of the invention, the servo data recovery circuit is included within a single application specific integrated circuit, which may further include other process elements, including the data sequencer, memory controller and spindle motor regulator, for example.

In one more facet of the present invention, a head positioner servo is provided for a disk drive making use of a storage disk defining a multiplicity of concentric data tracks divided into circumferential zones having differing data transfer rates, and a plurality of radially aligned, embedded servo sectors containing phase coherent servo information fields prerecorded at a single clocking rate T at the time of manufacture, the servo information fields comprising e.g., sync, address mark, index, track number and centerline correction information, and a positioner for positioning a data transducer head over selected ones of the multiplicity of the data tracks. The head positioner servo includes:

servo state machine circuitry responsive to an internal servo timer circuit and connected to a data path leading from the data transducer head as it passes over a said servo sector, the servo state machine for detecting said sync, address mark and track number from said servo sector, and for resetting said internal servo timer upon detection of the said address mark, sample and hold circuitry connected to a data path leading from the data transducer head as it passes over the centerline correction information and controlled by the servo state machine for sampling and holding the centerline correction information, a programmed digital processor responsive to the servo state machine during track seeking .operations of said servo for determining actual head position from said detected track number, and responsive to the sample and hold circuit for determining track centerline correction values during track following, the programmed digital processor including an output circuit or port for putting out head position control values to said positioner during track seeking operations and during track following operations.

As an aspect of this facet of the invention the servo state machine comprises:

a master state machine for detecting said address mark and for accumulating track number bits, a sync and data code violation pattern detector slave state machine controlled by said master state machine for detecting flux transition patterns comprising said sync and unique data code violating patterns associated with said servo address mark, and a data reader slave state machine controlled by said master state machine for detecting flux transition patterns comprising each bit of said track number bits.

These and other objects, advantages, aspects and features of the present invention will be more fully understood and appreciated by those skilled in the art upon consideration of the following detailed description of a preferred embodiment, presented in conjunction with the accompanying drawings.

BRIEF DESCRIPTION OF THE DRAWINGS

In the Drawings:

FIG. 2 is a diagram of a servo sector showing the fields thereof and further showing the data flux transition patterns in relation to clocking cycles.

FIG. 3C includes an inset showing an exemplary data field split into three segments by two intersecting servo sectors in relation to the electrical circuitry of the data storage subsystem which processes the split data field and embedded servo sectors.

FIG. 4 is a detailed block diagram of an asynchronous embedded servo data recovery circuit in accordance with the principles of the present invention.

DETAILED DESCRIPTION OF A PREFERRED EMBODIMENT

Figure 1:
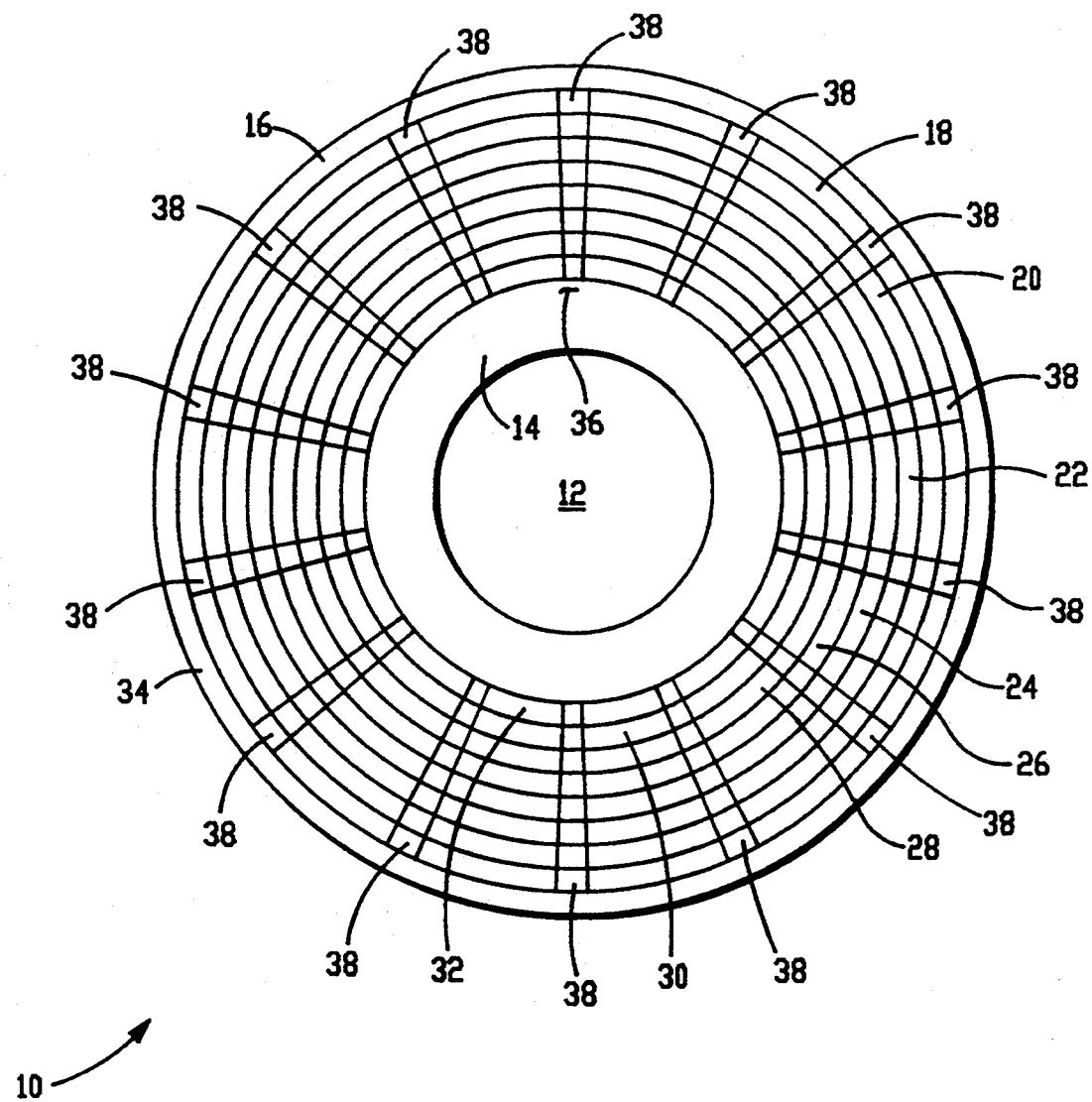
FIG. 1 is a plan view of a data storage disk data pattern in accordance with aspects of the present invention wherein the pattern includes a multiplicity of concentric data tracks divided into zones or circumferential bands, and a series of radially extending, intersecting servo sectors which interrupt at least some of the data sectors.

Servo issues confronting an embedded sector design are perhaps best understood by considering the FIG. 1 plan view of a disk data storage surface. A rotating storage disk 10 is formed of suitable substrate material such as metal or glass and coated with a magnetic storage medium such as a thin film medium which is vacuum sputter deposited onto the substrate. The disk 10 defines a central opening 12 to enable a rotating hub securely to clamp the disk to a disk spindle. Between an inner landing zone area 14 and an outer peripheral zone 16, a data storage area of a multiplicity of concentric data tracks is defined. The tracks are arranged into e.g. eight data zones, 18, 20, 22, 24, 26, 28, 30 and 32, from the radially outermost zone 18 to the radially innermost zone 32. A system information region 34 lies radially outwardly beyond the zone 18, and diagnostics and guard region 36 lies just inside of the inner landing zone area 14.

Zone 18 includes e.g. 110 tracks, each having 58 data sectors, with a storage density of 43,334 bits per inch (32,500 flux changes per inch encoded in 1,7 run length limited code). The raw data rate is 18.13 megabits per second, with a raw code rate of 27.20 Megahertz. Zone 20 includes e.g. 109 data tracks, each having 56 data sectors per track, with a storage density of 44,269 bits per inch (32,202 FCI), a raw data rate of 17.45 MBPS and a raw code rate of 26.18 MHz. Zone 22 includes e.g. 109 concentric data tracks, each having 52 data sectors per track, a storage density of 42,382 MBPS (31,787 FCI), a raw data rate of 15.69 MBPS and a raw code rate of 23.53 MHz. Zone 24 includes e.g. 109 data tracks, each having 52 sectors per track, with a storage density of 45,334 MBPS (34,008 FCI) and a raw data rate of 15.69 MBPS and a raw code rate of 23.53 MHz. Zone 26 includes e.g. 109 data tracks, each having 47 data sectors per track, a storage density of 45,900 BPI (34,425 FCI), a raw data rate of 14.77 MBPS and a raw code rate of 22.15 MHz.

Zone 28 includes e.g. 108 data tracks, each having 44 data sectors, a storage density of 47,008 BPI (35,256 FCI), a raw data rate of 14.00 MBPS and a raw code rate of 21.00 MHz. Zone 30 includes e.g. 108 data tracks each having 41 data sectors, a storage density of 47,294 BPI (35,471 FCI), a raw data rate of 12.98 MBPS and a raw code rate of 19.43 MHz. Innermost data zone 32 includes e.g. 108 concentric data tracks each having 39 sectors per track, a storage density of 48,371 BPI (36,278 FCI), a raw data rate of 12.09 MBPS and a raw code rate of 18.13 MHz. The outer system zone 34 includes e.g. 14 tracks following e.g. the Zone 32 format, and the inner diagnostics zone 36 includes 1 track also following the Zone 32 format. A guard band of four tracks lies immediately inside of the diagnostics zone 36.

FIG. 1 also depicts a series of radially extending, regular servo sectors 38. In this particular example, there are some 52 radial servo sectors 38 (shown as several narrow spokes in FIG. 1) which are preferably equally spaced around the circumference of the disk 10. While the number of data sectors in each zone varies, it is apparent from inspection of FIG. 1 that the number of embedded servo sectors remains invariant throughout the extent of the storage surface. As each data sector is of fixed storage capacity or length (e.g. 512 bytes of user data per data sector), and since the density and data rates vary from data zone to data zone, it is intuitively apparent that the servo sectors 38 interrupt and split up at least some of the data sectors or fields, and this is in fact the case in this presently preferred example. The servo sectors 38 are preferably recorded with a conventional servo writing apparatus at the factory. A laser servo writer and head arm fixture suitable for use with the servo writer are described in commonly assigned U.S. Pat. No. 4,920,442, the disclosure of which is hereby incorporated herein by reference.

FIG. 2 illustrates graphically the servo pattern for each servo sector 38. The basic cell period (T) for the flux transitions within the servo sector is 62.5 nanoseconds (16 MHz). This constant cell period or rate remains invariant throughout the radial extent of the servo sectors 38, and in this manner differs from the data storage zones 18-32. Each sector occupies e.g. 386 T or 24.125 microseconds.

In this particular example, there are e.g. 12 discrete, phase coherent fields within each servo sector 38. As illustrated in FIG. 2, the sector 38 begins with a 72 T AGO, field 40 (a 3 T pattern 100 repeated 24 times), followed by an 18 T servo sync field 42 (a 3 T pattern 100 repeated 6 times), followed by a 37 T servo address mark field 44 (a 14 T pattern repeated two times, followed by a data bit "zero"), followed by a 9 T spindle index field 46 (a data bit "one" for the index sector and a data bit "zero" for all other sectors), followed by a 108 T track identification field 48 (twelve data bits encoded in Gray code), followed by a first 8 T dc erase gap 50, followed by a first 36 T A burst field 52 (a 3 T pattern 100 repeated 12 times) followed by a second 8 T dc erase gap 54, followed by a second 36 T B burst field 56 (a 3 T pattern 100 repeated 12 times), followed by a third 8 T dc erase gap 58, followed by a third 36 T C burst field 60 (a 3 T pattern repeated 12 times), and finally followed by a fourth 10 T dc erase gap 62 which marks the boundary between the servo sector and the start or resumption of the data sector.

In this particular example, a data bit "one" has a cell format of 10 010 000 0; and, a data bit "zero" has a cell format of 10 000 010 0. In the case of a data bit one, or a data bit zero, there are never more than five zero cells between flux transitions (denoted by 1). The first flux transition of the data bit provides a means for positively synchronizing the asynchronous data reader to the data bit sequence, as will be more particularly pointed out and explained hereinafter. Thus, each servo data bit comprises three cell triads: a first or sync triad (010), a second triad (010 or 000) and a third triad (000 or 010).

In order to realize an effective, reliable and robust digital head positioner servo loop employing servo information within embedded sectors, it is necessary to be able to detect the location of each embedded sector. Detection of each embedded sector 38 requires detection of an unmistakable marker. The marker may be a hard servo sector pulse derived by e.g. a reluctance sensor from a code disk attached to the disk spindle, or in the present example, it most preferably may be a servo address mark decoded from patterns contained within the servo sector 38. A servo address mark will include at least one flux transition pattern which is not going to be mistaken for any legal data pattern in accordance with the selected data code, or particular data zone.

In the present example, the design of a unique servo sector address mark is complicated by the presence of data zones, one or more of which may have a pattern which so resembles a servo address mark as to cause confusion within the servo loop. Accordingly, it has been found that two successive 14 T patterns, followed by a data zero triad pattern, i,e., 10000000000000 10000000000000 10 000 010 0 provides a very robust and reliable servo address mark. This design takes into account the 1,7 RLL coding employed in the data zones. This coding pattern implies that there may be a legal data pattern of 10000000 (i.e. a flux transition followed by seven zero flux transition intervals or cells at the particular data rate). The actual time period for any legal 1,7 coding pattern employed within any one of the data zones will not equal or exceed the time period of the 14 T pattern within the servo sector. When bit shift tolerance of the present invention is taken into account, in which a 13 T pattern will be decoded as a 14 T pattern, the maximum time period cannot equal or exceed a 12 T (servo frequency) time period. While it is conceivable that noise and other conditions might give rise to the detection of a data field pattern mistakenly thought to be a 14 T pattern, the occurrence of such a pattern, followed immediately by another like 14 T pattern, followed by a servo data bit zero pattern is most unlikely. Once the servo address mark is found, a servo sector timer is restarted, so that the next servo pattern may be located. The operation of the state machines which decode the 3 T, 14 T and data bit one or zero patterns is discussed in much greater detail hereinafter. While the present patterns for the servo address mark are preferred, other patterns may be employed with very satisfactory results. For example, the first 14 T code violating pattern may be followed by a data bit zero pattern which is then followed by a second 14 T pattern. Also, the servo address mark patterns (and track identification numbers) may be recorded and/or decoded from patterns in alternating servo sectors, etc. While it is not necessary for each servo pattern to include all of the fields depicted in FIG. 2, a very robust and reliable digital head position servo is realized by employing the information available in all of the fields as depicted.

The A burst, B burst and C burst fields 52, 56 and 60 are used in realizing an edge servo which is more particularly described in commonly assigned and copending parent U.S. Pat. No. 5,170,299, the disclosure of which is hereby incorporated by reference. The servo data recovery circuit 130 of the present invention is primarily directed to the decoding of the servo address mark and the track number. However, before discussing the servo circuit, an overview of an exemplary disk drive data storage subsystem 100 incorporating the present invention follows.

Figure 3A:
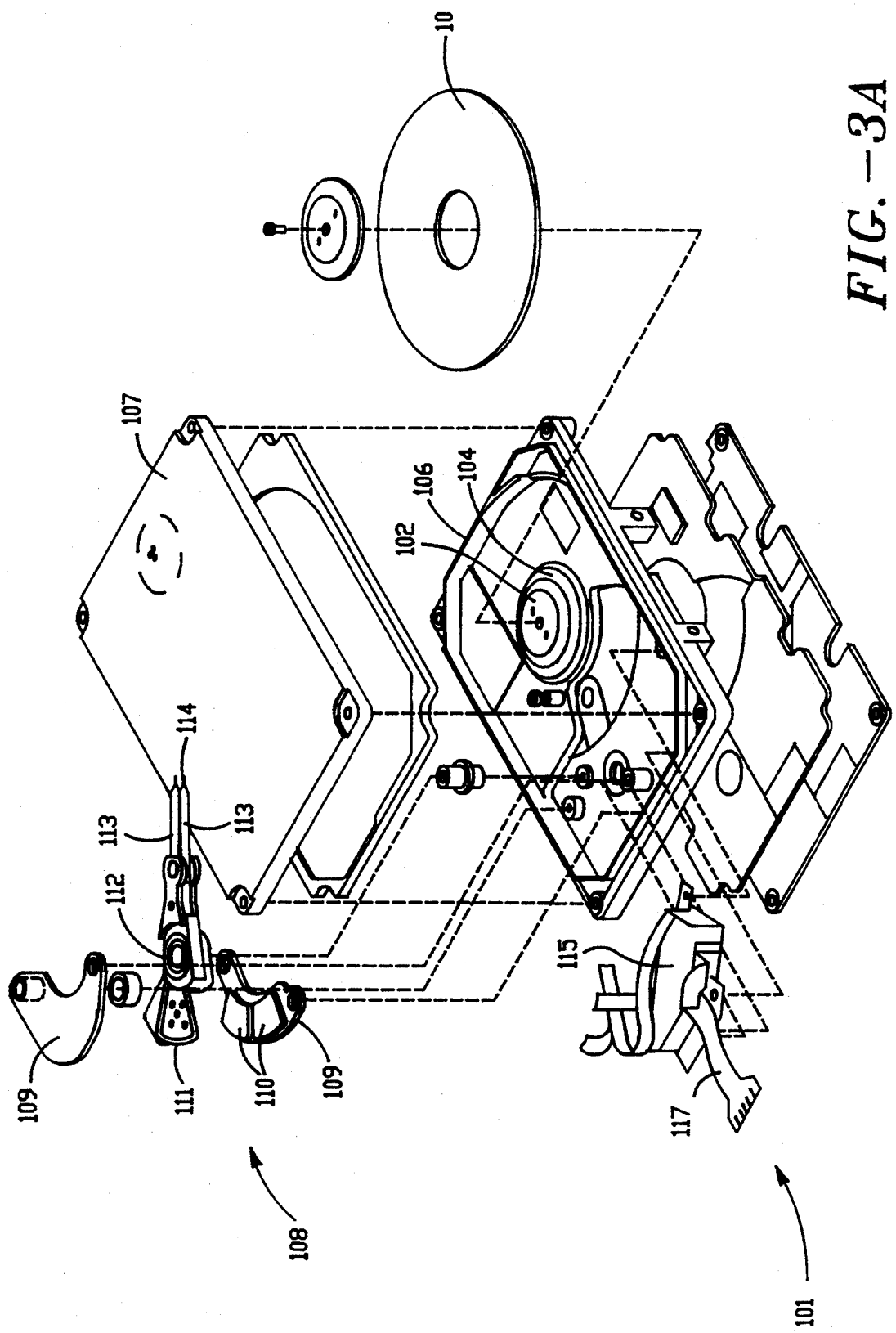
FIG. 3A is an exploded isometric view of a head and disk assembly of a sub-micro Winchester fixed disk drive incorporating principles and aspects of the present invention.
Figure 3B:
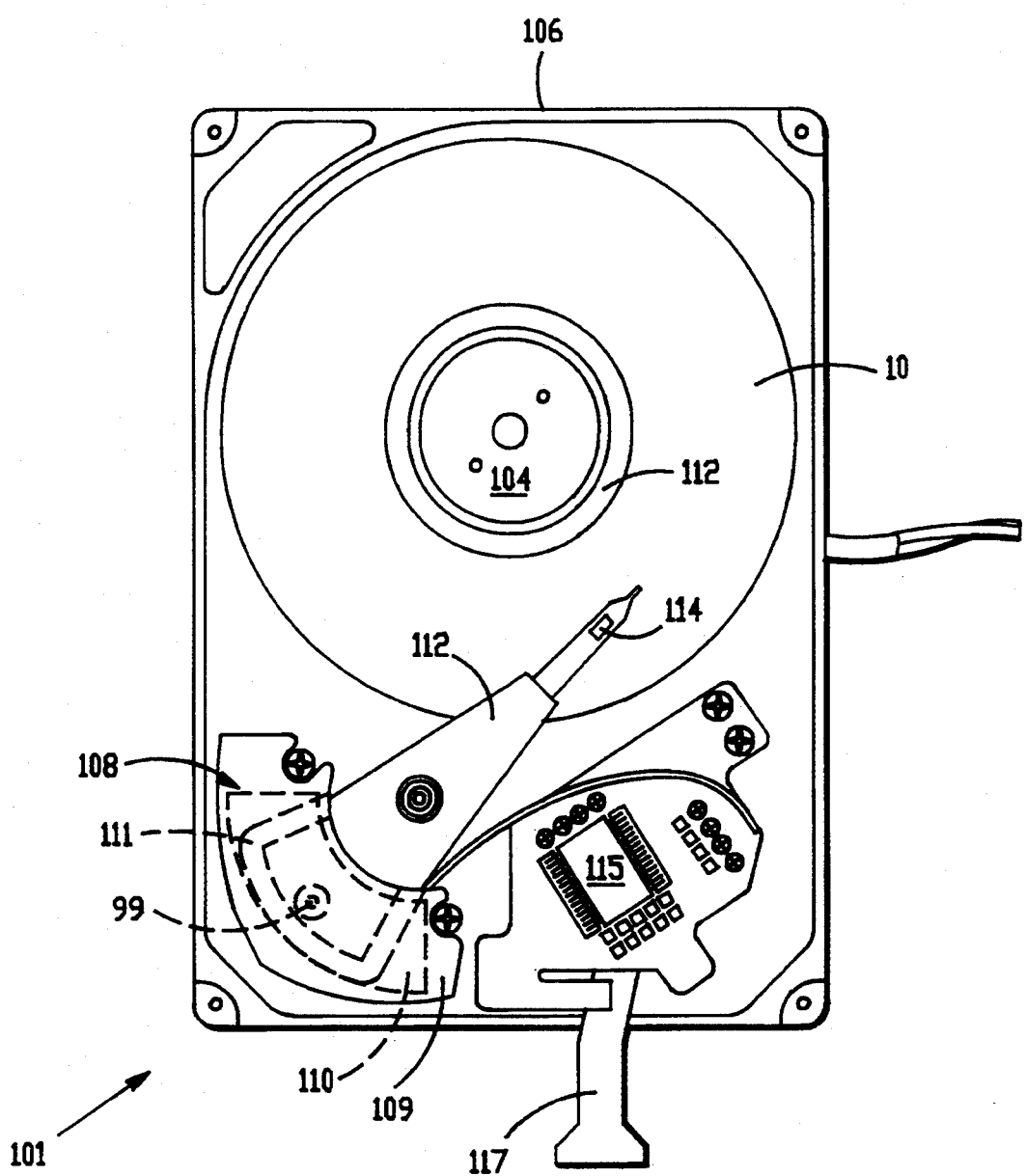
FIG. 3B is a plan view of the FIG. 3A head and disk assembly.

Turning now to FIGS. 3A and 3B, a head and disk assembly 101 of an exemplary fixed disk drive data storage subsystem 100 is depicted in an approximate real size plan view. The data storage disk 10 may have any suitable diameter. While two and one half inches is presently preferred, larger disk diameters, such as three and one half inches, five and one quarter inches, eight inches or larger, or smaller disk diameters, such as 1.8 inch, or smaller, are also clearly within the contemplation of the present invention. The data storage disk 10 is mounted upon a rotating spindle assembly 102 which is rotated by an in-spindle brushless DC spindle motor 104 relative to a frame or base 106, preferably formed of injection cast aluminum alloy, for example.

A cover 107 is secured to the base 106 via screws and a compressible gasket, thereby providing a hermetically sealed interior space within the head and disk assembly. Most preferably, motor bearings formed as a part of the spindle motor are used to rotate the spindle assembly 102 relative to the base 106; and, the spindle motor itself is mounted to the base casting 106, as is conventional in miniature head and disk assemblies. A suitable motor driver circuit 107 is provided to commutate e.g. the three-phase windings of the brushless motor. Hall sensors, not shown, may be provided in order to determine the position of the rotary permanent magnet element relative to the fixed windings and poles of the motor 104 and provide feedback control information to the motor driver circuit 107 in conventional fashion.

A head position actuator mechanism, most preferably a mass-balanced rotary voice coil actuator 108 of the type generally shown in the referenced '004 patent includes a flux return fixed part 109 comprising upper and lower flux return plates, with e.g. at least the lower plate including a highly magnetic flat permanent magnet 110 formed of rare earth element such as Neodymium. A flat, wedge-shaped moving coil 111 defining an open inner space and being integrally formed with or otherwise mounted to a rotary actuator 112 moves in a magnetic gap formed between the magnet 110 and the upper flux return plate. The rotary actuator 112 is journalled about bearings mounted to a post extending from the base plate 106. To provide additional rigidity, the actuator post may also be secured to a top cover by a removable screw, for example. An elastomeric crash stop 99 engages inside walls of a mandrel around which the coil 111 is wound and encased, as by molding or potting material, thereby limiting rotational displacement of the coil and the attached rotary actuator 112.

As noted, the rotary actuator 112 includes a bearing assembly mounted to the base 106 via the actuator post so that the rotary actuator is free to rotate about a locus of limited rotational displacement. Current passing through the coil in one direction results in application of a rotary reaction force of the rotary actuator 112 in one direction while current flow in another direction results in a rotary force being imparted to the rotary actuator 112 in an opposite direction. The rotary actuator 112 thus moves a ganged, substantially in-line head arm assembly across the surfaces of the disks within the drive. The head arm assembly includes a separate in-line load beam 113 for each data transducer head 114. In the present single storage disk example given in FIG. 3A, the rotary actuator 112 supports e.g. two oppositely aligned data transducer heads 114, so that both surfaces of the disk 10 are used for storage and retrieval. If two or more spaced apart disks are included within the disk drive 100, at least one data head 114 is provided for each surface and is commonly positioned with the other heads 114 by movement of the rotary actuator assembly 112.

The data transducer head 114 may be of the thin film or MIG type, and it most preferably operates in a contact start-stop mode. Details of a reverse flange load beam and associated head and disk assembly facilitating initial head loading during drive assembly and other features, are described in commonly assigned U.S. patent application Ser. No. 07/610,306, filed on Nov. 6, 1990, now U.S. Pat. No. 5,027,241, the disclosure of which is hereby incorporated by reference.

Magnetic flux transitions comprising both user data and servo sector data 38, are written by or read by the head 114 during data write or read operations. The data read by the head 114 is passed through a preamplifier circuit 115 which also provides head selection and write driving functions during data write operations. A conventionally available integrated circuit, such as the SSI 32R4610 four channel thin film head read/write device made by Silicon Systems, Inc., Tustin, Calif., or equivalent, is presently preferred for implementation of the circuit 115. The circuit 115 enables four separate heads 114 to be individually selected, and the circuit 115 is preferably mounted within a space defined within the head and disk assembly 101 upon a Mylar circuit substrate 117 which carries conduction traces leading to connections at an external printed circuit board carrying the other circuit elements of the disk drive 100. The circuit 115 is placed as close to the heads 114 as possible in order to reduce connection lead length, and to improve signal to noise ratios for each of the heads 114.

Figure 3C:
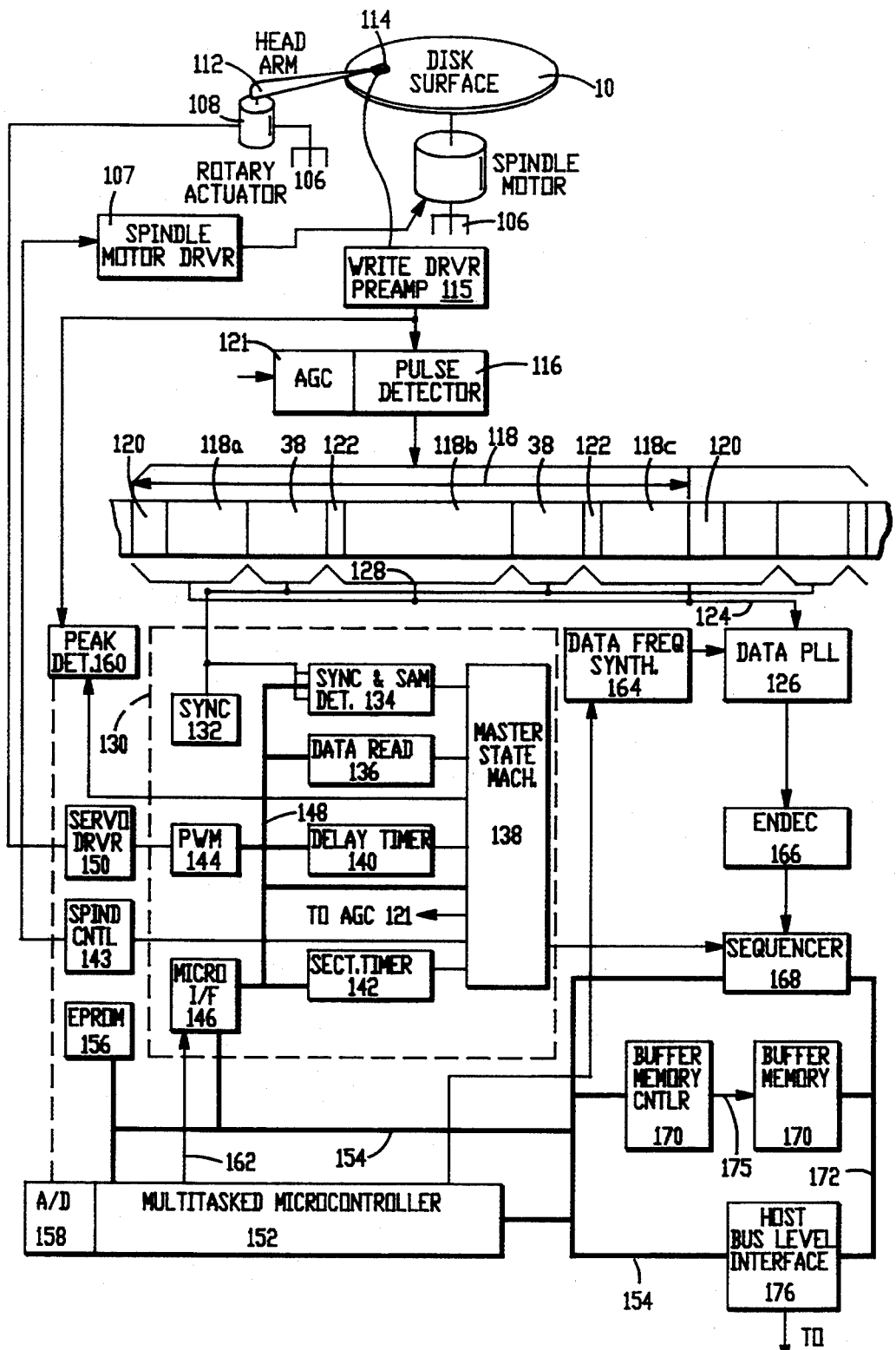
FIG. 3C is an electrical block diagram of a fixed disk data storage subsystem which may include the FIG. 3A head and disk assembly and is in accordance with principles of the present invention.

Turning now to the system block diagram provided in FIG. 3C, analog flux transitions are delivered to a pulse detector circuit 116. Gain of the pulse detector circuit 116 is controlled by an AGC control circuit 121. The pulse detector circuit 116 decodes the analog flux transitions into shaped digital edges or pulses representative of encoded data, including split data field data, the duration of one block being denoted by the arrow line 118 and servo data, denoted by the arrow line 38. The data field 118 diagrammed in FIG. 3 is split up into three segments 118a, 118b, 118c by two servo sectors 38. A data field header 120 includes a sector and head count, and further includes e.g. three count bytes which indicate the number of bytes in each of the segments 118a, 118b, 118c, for example. Error detection code information is also preferably included within each data field header 120. Data segment headers 122 are provided to enable resynching to the data rate following each embedded servo sector 38 within the split data field 118.

As shown in FIG. 3C, the data stream is essentially electrically switched and time-divided into two paths: a data path 124 leading to a data phase lock loop circuit 126; and, a servo path 128 leading to a servo data recovery circuit 130. Since the data path 124 employs eight different data zones, as well as certain additional system overhead zones as discussed in conjunction with FIG. 1, it is necessary to synchronize the data phase lock loop circuit 126 to the data rate of each zone. On the other hand, the servo sectors operate at a standardized data rate of 16 MHz (62.5 ns per T clock cell). Thus, servo data processing within the drive occurs separately from and asynchronously with the various data transfer rates.

The servo data recovery circuit 130 includes a synchronizer 132 which synchronizes incoming raw data from the pulse detector 116 to an internal 16 MHz clock reference, a sync and 14 T detector 134 which detects nominal 3 T and 14 T patterns found in the servo sync field 42 and the servo address mark field 44, a data reader 136 which detects triplet patterns forming data bits of the address mark field 44, index field 46 and the Gray coded track numbers included within the track number field 48, and a master state machine 138 which generates states providing timing signals and windows for each of the fields 40, 42, 44, 46, 48, 50, 52, 54, 56, 58 60 and 62 of each servo sector 38, and which supervises operation of the sync and 14 T detector 134, and the data reader 136.

A delay timer 140, a sector timer 142, a motor speed regulator circuit 143, a head position servo pulse width modulator 144 and a microcontroller interface 146 are interconnected with the synchronizer 132, sync and 14 T detector 134, data reader 136, and master state machine 138 by a bus structure 148 comprising data, address and control lines.

The delay timer 140 provides a programmable method for controlling the length of certain functions (states) performed by the master state machine 138. The delay timer 140 is implemented as an eight-bit, upcounting, synchronously loadable counter running at the operating frequency (T or 16 MHz) of the servo decoder circuit 130. Thus, the delay timer carryout (DLYDONE) is used to signal the master state machine 138 that the programmed time delay interval has elapsed.

The sector timer 142 provides a programmable method for controlling the length of a servo sector and other servo data reader functions including servo interrupt, servo-data overwrite protection (WEDGE), discharging of the servo peak detectors 160, write to read recovery time and read/write AGC timing. The sector timer 142 is a 12-bit upcounting, synchronously loadable counter running at one half of the operating frequency of the servo data decoder 130 (½ T or 8 MHz). Each sector timer count is 125.0 nanoseconds.

When the master state machine 138 detects a servo address mark, it signals the sector timer via the SETSAM line. SETSAM causes the current value of the sector timer to be saved in the SAM to SAM time register, and the sector timer 142 to be reset to zero. If the master state machine 138 misses detection of a servo address mark, the sector timer 142 does not get reset at SAM time and keeps counting upwardly. When the sector timer 142 reaches the time equal to the TIMESUP timeout register, it sends the SETTIMESUP signal to the master state machine, indicating a TIMESUP timeout condition has occurred. At this time the sector timer 142 loads the value from the, TIMESUP load time register, which is the time the sector counter 142 would nominally be at had the servo address mark been detected and the sector counter 142 reset. Loading the TIMESUP load time enables the master state machine 138 to finish processing the current servo sector 38, so that the sector timer may thereafter begin looking for the next servo address mark at the correct time. The SETTIMESUP signal is also sent to the master state machine 138 when the sector timer reaches the TIMESUP load time. This enables the master state machine 138 to finish processing the current servo sector 38 if there was a data error while reading the index bit or the track number.

The motor speed regulator circuit 143 comprises an index sector timer which times e.g. commutation pulses from the motor driver circuit 107 with a nominal reference period, and puts out "slow down" or "speed up" values to the motor control circuit 107. By thus regulating spindle speed, it is practical to recover the servo sector information "asynchronously" i.e., without requiring phase lock to the incoming data stream, thereby providing very rapid, robust and reliable acquisition of embedded servo information the pulse width modulator 144 provides driving signals to a servo driver 150 which in turn generates driving currents to power the rotary actuator 108 in a controlled fashion during track seeking, track settling and track following operations.

The microcontroller interface 146 interconnects the servo data circuit 130 with a multi-tasked microcontroller 152 via a data/address/control bus 154. A program memory stores control program routines which are called and executed by the microcontroller 152. The microcontroller 152 further includes an analog to digital converter 158 which is connected to receive and convert to digital values sampled amplitudes of the A, B and C servo bursts which are sampled and held in a peak detector 160.

The peak detector 160 receives analog flux transition amplitude samples of the A, B and C servo bursts and holds each sample for digital quantization by the analog to digital converter 158. Burst amplitude sampling is timed by timing signals generated by the master state machine 138. Decoding of the A, B and C servo burst fields 52, 56 and 60 is carried out by the microcontroller 152 in accordance with programming of the microcontroller 152 as described in the referenced, commonly assigned U.S. Pat. No. 5,170,299, incorporated by reference. The referenced approach results in an effective edge servo which resolves head position with respect to a particular track within a predetermined quantization range, such as thirty two increments per track pitch.

A digital head position servo loop of the type described in a commonly assigned U.S. Pat. No. 4,669,004, also incorporated herein by reference, is implemented via the control path leading through the microcontroller 152 and via the control firmware.

The microcontroller interface 146 may also provide a single bus path for a data sequencer 168 and for a buffer memory controller 174 advantageously to decode program memory addresses from the control bus 154 and apply them to the program memory via an address bus 175. A four bit address bus 162 is provided from the microcontroller 152 to the circuit 130 via the interface 146. The four bit address bus enables internal registers of the circuit 130 to be directly accessed by the microcontroller 152. The internal registers associated with the circuit 130 are described hereinafter.

Returning attention now to the data path 124, the data phase lock loop 126 operates at a plurality of raw data rates, one selected for each data track zone. The microcontroller 152 is aware of the particular zone over which the head 112 is positioned during both track seeking and track following operations. A data frequency synthesizer 164, controlled by the microcontroller 152, generates a particular raw data rate appropriate to the particular zone in which the head is located. In this regard, for the various data rates given for the data zones in conjunction with the discussion of FIG. 1 above, zones 32, 34 and 36 have a synthesizer frequency of 1.067 MHz, zone 18 has a synthesizer frequency of 1.600 MHz, zone 20 is 1.455 MHz, zones 22 and 24 are 0.941 MHz, zone 26 is 1.231 MHz, zone 28 is 1.000 MHz, and zone 30 is 1.143 MHz.

Following the data PLL 126 is an encoder-decoder (ENDEC) 166 which encodes incoming data, and which decodes outgoing data, into and from a predetermined variable length, zero run length limited code, most preferably 1,7 RLL code. The structural details of the encoder-decoder 166 are set forth in the commonly assigned U.S. Pat. No. 4,675,652, the disclosure of which is incorporated herein by reference. The ENDEC 166 leads to a data sequencer 168 which controls the sequence of data blocks to and from the storage surface of the disk 10. With split data fields or blocks, it is the sequencer 168 which is responsible for formatting each block in a fashion that is compatible with the embedded servo sectors. Accordingly, during a data field format operation, the sequencer 168 generates count bytes and appends them into the data block ID field 120 for each block, and during data block writing to the disk, and read back from the disk, the sequencer stores the count bytes in a stack and pops the stack for each incoming data field segment, thereby decoding in real time the serial by byte data stream between split-data block segments segments into contiguous data blocks. The blocks are thus passed between a buffer memory 170 via a data transfer bus 172 and the disk surface via the read channel.

Error correction of data blocks and error detection of count byte errors within the split data field sectors is carried out by an error correction operation as more particularly described in the commonly assigned, copending U.S. patent application Ser. No. 07/650,791 filed on Feb. 1, 1991, now U.S. Pat. No. 5,241,546, entitled "On-The-Fly Error Correction with Embedded Digital Controller", the disclosure of which is hereby incorporated by reference.

A more detailed structural and functional discussion of the data sequencer 168 described herein is provided in commonly assigned, copending U.S. patent application Serial No. 07/710,861, filed this Jun. 5, 1991, the disclosure of which is hereby incorporated by reference. A more detailed structural and functional discussion of the overall disk drive data storage subsystem is provided in commonly assigned and copending U.S. Pat. No. 5,255,136, the disclosure of which is hereby incorporated by reference.

As noted the buffer memory 170 provides temporary storage for plural blocks of data, during both reading operations when data is outgoing to a host 178, and writing operations when data is incoming from the host 178. A buffer memory controller 174 connected to the bus 154 to control the locations at which the bytes of each block are stored within the block buffer memory 170. Caching routines may be called by the microcontroller 152 and executed in order to manage more optimally the amount and kind of data which is temporarily stored within the buffer memory 170 in accordance with any of a number of know data caching algorithms.

The buffer controller 174 controls operation of the buffer memory 170. While conventional, the buffer controller 174 includes a microcontroller buffer access circuit enabling the microcontroller 152 to write bytes to, and read bytes from, specified addresses in the buffer memory 170 in accordance with values supplied over the bus 154. An address control generates and applies addresses to the buffer memory 170 over a buffer address bus 154. A master control state machine generates the necessary clocks for clocking data blocks into and out of the buffer memory 170 and supplies those clocks to the address control. A bus multiplexer within the buffer controller 174 selects between data from a sequencer FIFO and the microcontroller buffer access circuit.

A conventional bus level interface circuit 176, may be used for interfacing the storage subsystem 100 to the host computing system 178.

The interface circuit 176 includes bus drivers and other circuitry, such as a data FIFO buffer for buffering data flow from an external bus and the buffer memory 170. The circuit 176 may also include one or more state machines for decoding bus level commands. Internal registers may be provided for receiving commands from the microcontroller 152.

For example, the interface circuit 176, implemented as a conventional SCSI interface, is preferably configured to conform to the ANSI standard X3T9.2/82-2 Revision 17B at conformance level 2 for the small computer standard interface (SCSI), for example. It is controlled by a SCSI interface service routine executed by the microcontroller 152. The interface 176 includes hardware for controlling all critical timing operations on the SCSI interface bus. Decoding of commands, time-outs, and other non-critical timing operations are performed by the SCSI service routine. The interface circuit 176 also includes on-board drivers for at least a single-ended SCSI bus.

FIG. 4 sets forth a more detailed block diagram of the servo data recovery circuit 130, including the particular control and data lines passing between the raw data synchronizer 132, sync and 14 T detector 134, data reader 136, master state machine 138, delay timer 140, sector timer 142, and pulse width modulators 144.

Figure 5A:
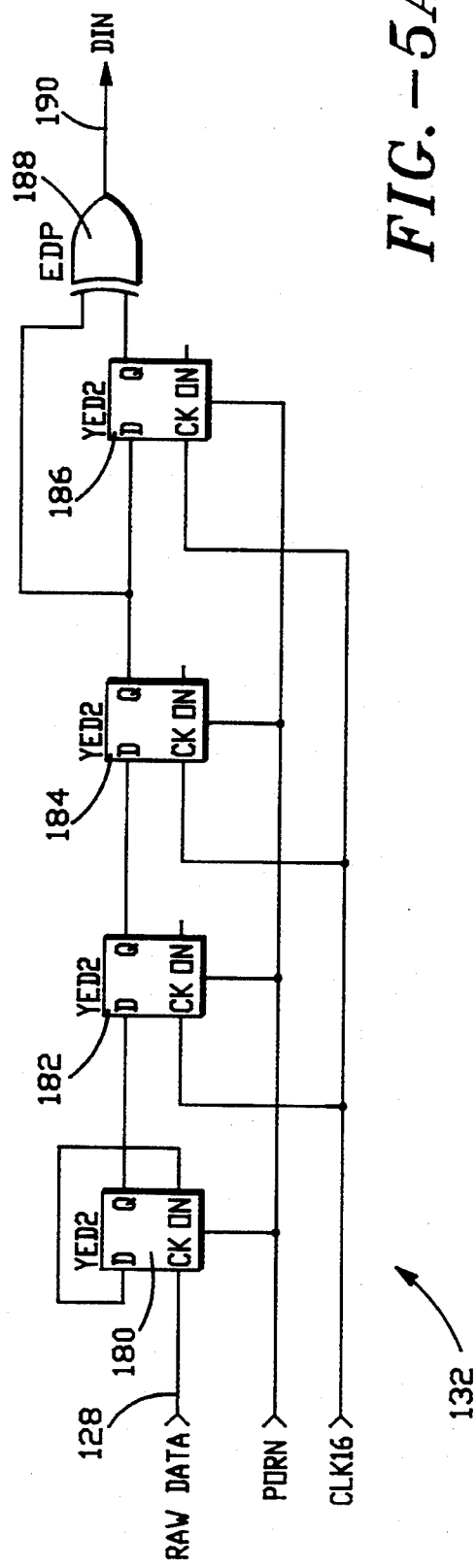
FIG. 5A is a logic block diagram of a raw data synchronizer of the FIG. 4 circuit.

Turning now to the servo path 128, as shown in FIG. 5A, raw data enters the raw data synchronizer 132. Other inputs include a power-on reset control (PORN), and a 16 MHz reference clock signal (CLK 16). The raw data synchronizer 132 comprises four D type flip-flops 180, 182, 184, and 186, and a two-input exclusive OR gate 188 configured as shown in FIG. 5A. The data synchronizer 132 functions to frame incoming raw data on the servo data path 128 with e.g. positive duty cycles of a master clock signal occurring at 16 MHz. It will be remembered that the basic clock frequency for the period T of the FIG. 2 servo sector data is 16 MHz, however spindle rotational tolerances and jitter for example may cause slight variations in the incoming raw data rate, and its phase will not normally be aligned with the phase of the reference clock signal.

Figure 5B:
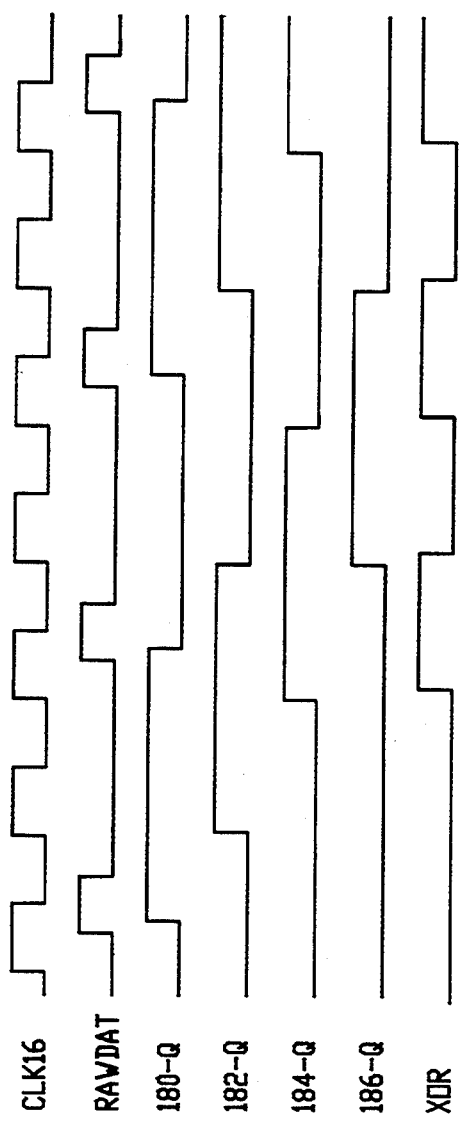
FIG. 5B is a timing diagram for the FIG. 5A raw data synchronizer.

In order to synchronize the raw data pulses from the pulse detector 116 to the reference clock, the flip flops 180, 182, 184 and 186 are clocked on rising edges of the clocking signal. The result of the logic circuit is shown in FIG. 5B, which illustrates several incoming raw data pulses which recur at the 2 T rate, but which are out of phase with the reference clock. By the time that the pulses propagate through the logic network 132, they have been offset in time so as to occur with the next rising edge of the reference clock. The output from the raw data synchronizer 132 is a data input (DIN) signal which is passed via a line 190 to the sync and 14 T detector 134 and the data reader 136.

MASTER STATE MACHINE 138

The master state machine 138 causes the fields 40, 42, 44, 46, 48, and 50 in each servo sector 38 to be processed, and provides delay timing for edge servo processing of the burst fields 52, 56, and 60, as separated by the interfield gaps 50, 54, 58 and 62. The master state machine 138 receives timing input signals from the delay timer 140 and from the sector timer 142, and it receives data inputs from the sync and 14 T detector 134 and from the data reader 136. The master state machine 138 has two main modes of operation: a normal mode, and a find-mode. The find-mode is invoked when the disk drive is initialized and the controller 130 first synchronizes in real time with the servo information within each servo sector 38. The supervisory microcontroller 152 enables the servo circuit 130 asynchronously relative to servo sector timing.

In find-mode, the servo circuit 130 loops to look for another servo address mark immediately following signalling by the master state machine 138 of any servo address mark error condition. In normal mode, when a servo address mark error condition occurs, the servo circuit 130 continues to process the current servo sample and marks time until the next expected occurrence of a servo sample as the disk rotates beneath the selected data head.

Figure 6A:
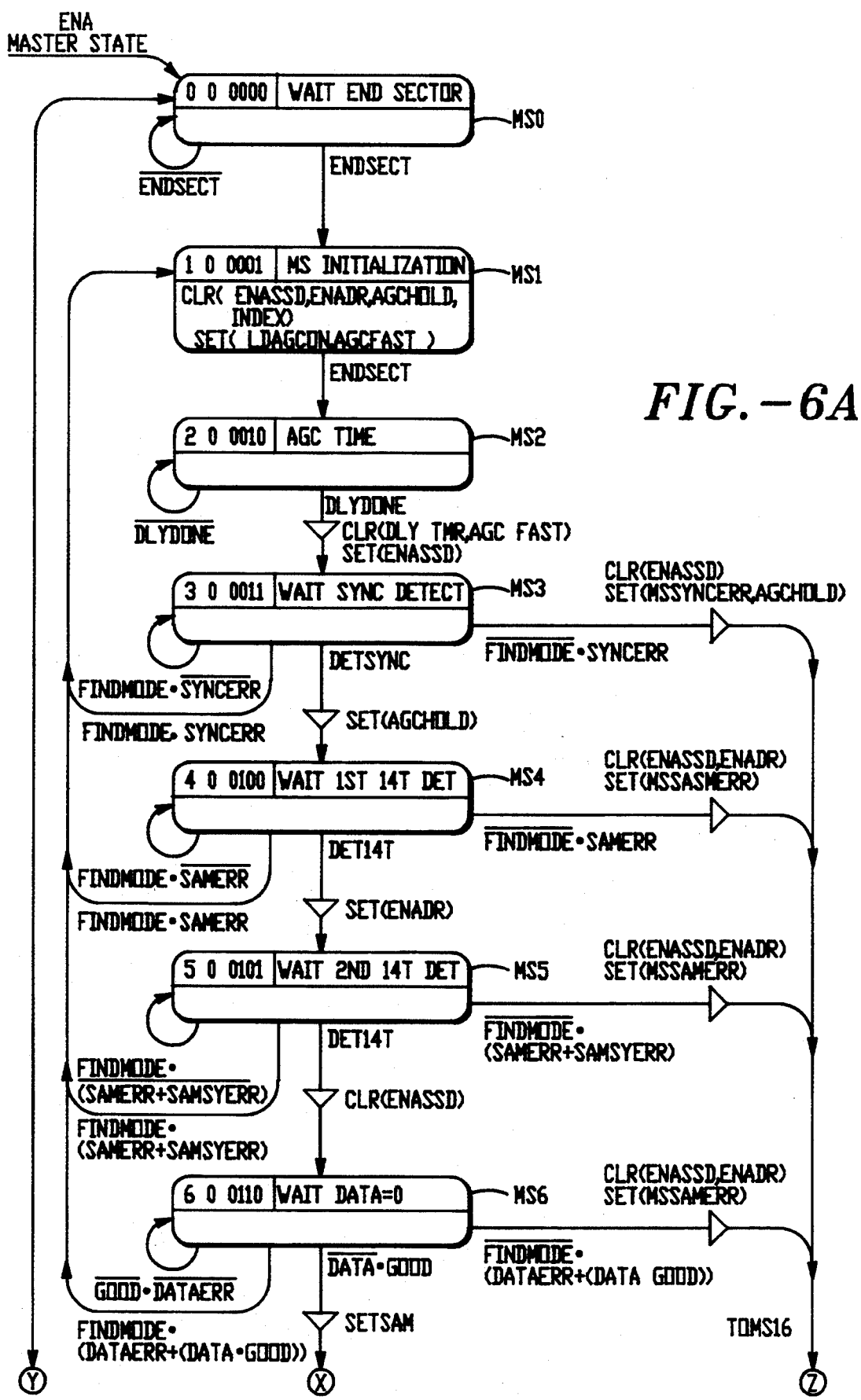
FIGS. 6A and 6B comprise a state diagram of a master state machine of the FIG. 4 circuit.
Figure 6B:
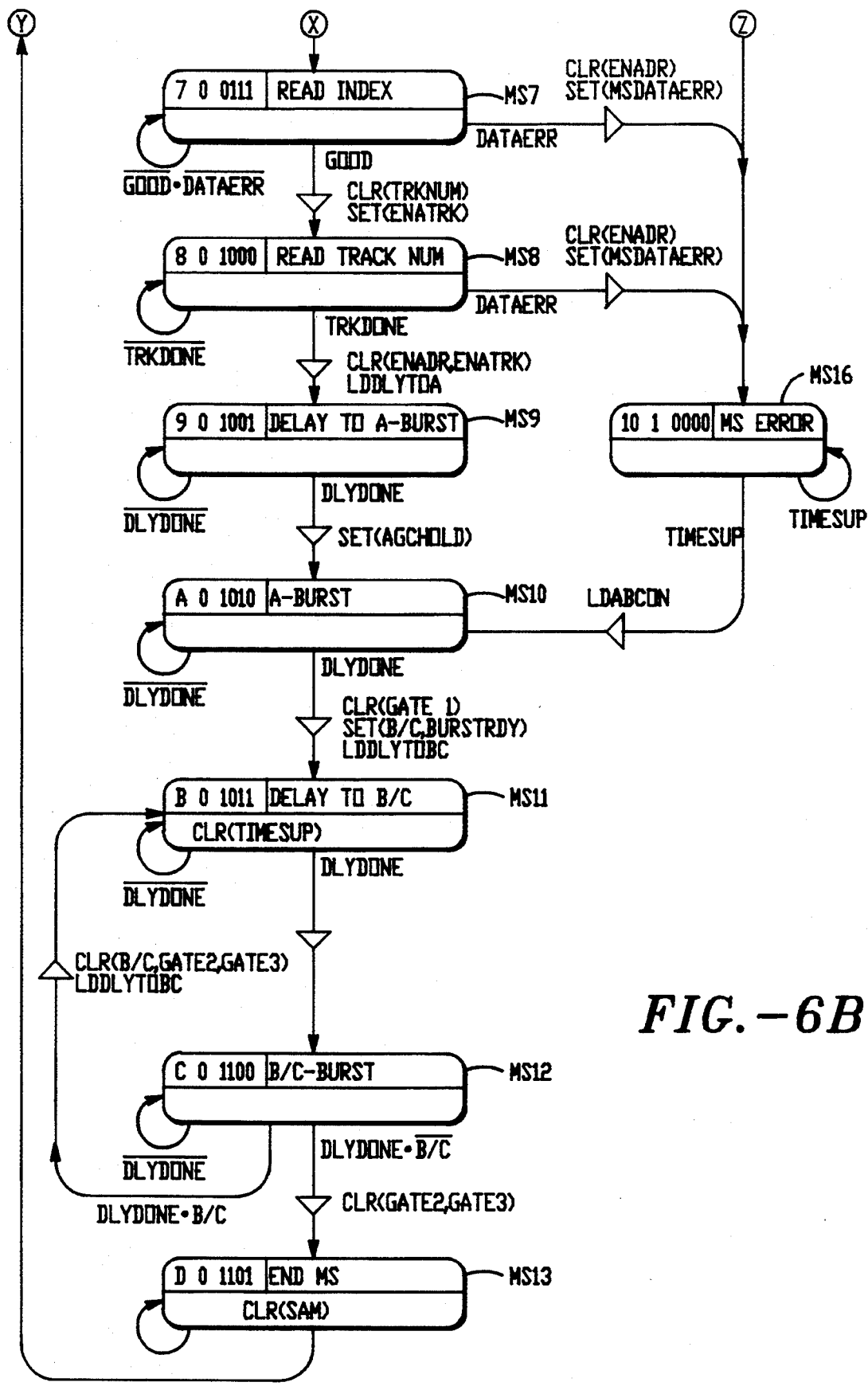

The master state machine 138 is best understood by reference to the FIGS. 6A and 6B master state machine state diagram. Since the function of the master state machine is to control timing and events related to decoding and processing of servo information present in each servo sector 38, FIGS. 1 and 2, the master state machine 138 basically idles in state MS0, a wait state mode, until arrival of the next servo sector 38. This wait state, state MS0, is controlled by a logical input END SECTOR. END SECTOR is generated by the sector timer 142 which times the interval from detection of the last valid address mark in the the last servo sector 38 to the beginning of the next servo sector 38. The sector timer 142 is reset upon arrival of a valid servo address mark, and begins its timing function from that event. The master state machine loops in state 0 so long as END SECTOR is not true. Once true, the master state machine 138 proceeds to state MS1.

In state MS1, the master state machine initializes the sync and 14 T detector 134 and the data reader 136 in order to begin processing the information being sampled within the servo sector being read. Also, an AGC time (which is a programmable time interval, thereby to accommodate AGC fields 40 of varying length) is loaded into a register of the delay timer 140.

In state MS2 the servo 130 begins the process of resetting the gain level of the pulse detector 116 by commanding the AGC control circuit 121 to operate in a fast AGC acquire mode in order to reset itself to the AGC field 40 passing beneath the selected data head. In state MS2 the sync information recorded in that portion of the AGC field 40 timed by the AGC time is acquired, and the gain of the pulse detector 116 is reset for this particular servo sector via the AGC control circuit 121. (It is important to remember that the data rate of each servo sector remains at the constant 16 MHz rate, while data rate of the spit data fields most preferably varies radially across the data storage surface, and it is therefore necessary to reset the gain of the pulse detector to the servo data rate for each servo sector). The master state machine 138 loops in state MS2 until the AGO, time (called DELAY DONE) as timed by the delay timer 140 has expired. During a transition between state MS2 and state MS3 of the master state machine (denoted by the convention of a triangle in the flow path between states MS2 and MS3), the delay timer 140 is cleared, the AGC fast mode is cleared, and the sync and 14 T detector 136 is enabled.

In state MS3 the master state machine 138 monitors signal control lines from the sync and 14 T detector 134. In this state the master state machine 138 monitors SYNC ERROR, SYNC DETECT and FINDMODE.

As noted, the find mode, or "FINDMODE" is a special mode, typically invoked during initialization or power on reset (POR) in order to resynchronize the servo circuit, including servo sector timer 142 to the actual servo pattern on the disk data surface. The FINDMODE sequence enables the servo circuitry 130 to lock onto the servo sectors 38 very rapidly, for the purpose of locating a valid servo address mark and track number field without undue aliasing and latency following a power up or a power on reset sequence (PORN). FINDMODE is also used in disk drives in which the servo sector information changes frequency of servo samples (T cell frequency) or location, or both, with the data zones. In servo architectures following a zoned servo data approach, FINDMODE provides a very rapid and reliable mechanism for relocating the servo sectors and the servo address marks when a zone boundary is crossed, as during track seeking operations.

The master state machine 138 loops in state MS3 until sync from the sync field 42 has been detected by the sync and 14 T detector 134. A branch occurs if FINDMODE and SYNC ERROR are both true. Another branch occurs if SYNC ERROR and SYNC DETECT are both false. Another branch to a master state machine error state occurs if FINDMODE is false and SYNC ERROR is true. During the transition to the master state error state, a sync error flag is set. If and when SYNC DETECT becomes true, a transition is made to state MS4, and during this transition, AGC HOLD is set, thereby causing the AGC, control circuit 121 to hold the present AGO, amplitude gain value for the balance of the present servo sector 38.

In state MS4, the master state machine 138 awaits arrival of a 14 T pattern detect (14 T DETECT) from the sync and 14 T detector 134. As shown in FIG. 2 the first 14 T pattern occurs within the servo address mark field 44. The master state machine 138 loops in state MS4 so long as SAM ERROR and 14 T DETECT are both false. In the event that FINDMODE and SAM ERROR are true, a branch to state 1 is made. In the event that FINDMODE is false and SAM ERROR is true, a transition to the master state error state is made. During this error condition transition, a master state SAM error flag is set. When 14 T DETECT becomes true, the master state machine 138 transitions to state MS5. During the transition between states MS4 and MS5, the data reader 138 is enabled.

In state MS5, the master state machine 138 awaits detection of the second 14 T pattern present within the servo address mark field 44. The end of this second 14 T pattern represents the end of the patterns detected by the sync and 14 T detector 134, and the beginning of the first data pattern detected by the data reader 136, as noted by TIME A in the servo address mark flux transition pattern depicted within the servo address mark field 44 in FIG. 2. The master state machine loops in state MS5 when SAM ERROR and 14 T DETECT remain false. If SAM ERROR and FINDMODE are true, a branch is made to state MS1. In the event that FINDMODE is false, and SAM ERROR is true, a transition to the master state machine error state MS16 is made. During this error condition transition, a master state SAM error flag is set. When the second 14 T pattern is detected by the sync and 14 T detector 134, as signalled by the 14 T DETECT signal becoming true, the master state machine 138 transitions to state MS6. During the transition between state MS5 and state MS6, the sync and 14 T detector 134 is disabled.

In state MS6, immediately following Time A, the data reader 136 begins to detect flux transition patterns, and the master state machine 138 is now awaiting inputs from the data reader 136. In this state, the master state machine 138 is looking for DATA to be false, indicating detection of a zero bit, and for DATA GOOD to be true. The master state machine loops in state MS6 when DATA GOOD and DATA ERROR both remain false. If [FINDMODE and DATA ERROR] is true, or [DATA GOOD and DATA] is true, a branch is made to state MS1. If FINDMODE is false and DATA ERROR is true, a transition is made to the master state error state MS16. During this transition a master state SAM error flag is set. When DATA is false and DATA GOOD is true, meaning that the data reader has read a valid 9 T pattern denoting a "zero" (i.e. 10 000 010 0), the master state machine 138 transitions to state MS7. On this transition to state MS7, the SET SAM line is asserted true, and the sector timer 142 is reset, denoting that a valid servo address mark has now been detected in this particular sector sample. At this time, the master state machine 138 is through with its find mode, if FINDMODE has been invoked.

In state MS7, the master state machine 138 is monitoring the data reader 136 which is in the process of reading the index bit (a data "one" pattern for the first servo sector 38, and a data "zero" pattern for all of the other servo sectors). The master state machine 138 loops in state MS7 until DATA GOOD becomes true. If DATA ERROR is true, a transition is made to the master state machine error state MS16, and during this transition a master state data error flag is set Once DATA GOOD is true, a transition is made to state MS8. On this transition to state MS8, the track number shift register is reset cleared and enabled.

In state MS8, the master state machine 138 receives sequentially each data bit from the data reader 136 comprising the track number read from the track number field 48. The master state machine loops in state MS8 so long as TRACK DONE and DATA ERROR remain false. As each bit comes in, DATA GOOD goes true, and the bit is stored in a bit position of the track number shift register. If, as each bit is received, TRACK DONE is false, a loop is made within state MS8. If DATA ERROR becomes true, a transition is made to the master state machine error state MS16, and during this transition a master state data error flag is set. When TRACK DONE becomes true, a transition is made to state MS9. During the transition to state MS9, a time interval is loaded into the delay timer 140 for the delay interval (delay field 50) which represents the space 50 (and time) between the end of the data field 48 and the beginning of the A burst field 52. Also, the data reader enable is cleared, and the track number register enable is cleared.

In state MS9, the master state machine 138 waits until arrival of the A burst field. This delay is carried out by a loop until DELAY DONE becomes true. When DELAY DONE becomes true, a transition is made to state MS10. During this transition, ABC BURST TIME is loaded into the delay timer to time the interval for the A, B and C burst (it being understood from FIG. 2 that this time (36 T) is the same for each of these bursts. Also, the AGC hold is set.

In state MS10 the A burst time is timed out when DELAY DONE again becomes true. A loop is executed until this happens. During A burst time, the amplitude of flux transitions read by the read channel 114 is sampled and held in the peak detector 160 operating under the control of the master state machine. When DELAY DONE becomes true, a transition is made to state MS11, and during this transition, a B/NOT C flag is set, a delay to the B or C burst is loaded, and the Burst Ready flag is set.

In state MS11 the master state machine 138 awaits arrival of either the B or C burst, as timed by DELAY DONE. An internal loop is executed until DELAY DONE becomes true. When DELAY DONE goes true, a transition is made to state MS12. During this transition, TIMESUP is reset, and ABC burst time is again loaded into the delay timer 140.

In state MS12, the B or C burst amplitude is acquired by the peak detector 160 during an interval timed by the DELAY DONE control put out by the delay timer 140. Since B/NOT C has been set prior to the first pass through state 12, the B burst amplitude is acquired. After DELAY DONE becomes true, a branch back to state MS11 is made, and during the loop back transition, B/NOT C is set false thereby indicating that the next pass through states MS11 and MS12 will be associated with the C burst interval, and a delay time for delay to the B/C burst is set into the delay timer 140. At the end of the C burst interval, a transition is made to state MS13.

At state MS13, the end of the servo pattern has been reached, and the master state machine 138 is now cleared, and a branch to state MS0 is made, and the states of FIG. 6 are repeated for the next and each successive servo sector.

To summarize, there are four error conditions detected by the master state machine 138: 1) an error detected in master state MS3 in detecting the sync pattern; 2) a servo address mark error in master states MS4, MS5 or MS6 detecting the 14 T pattern; 3) a data error in master states MS7 or MS8 detecting the track number or index pattern; and, 4) a soft error occurring in master state MS8 detecting the track number pattern. The first three error conditions are "hard errors" create a latched condition which is cleared only upon supervisory intervention by the microcontroller 152. The fourth error condition "soft error" is latched, but the latch is cleared with the next servo sample. The master state machine error state MS16 has a preset TIMESUP delay time which controls internal looping within this state. The master state machine error state MS16 feeds into state MS10, as shown in FIG. 6. During the transition from the master state machine error state MS16 to state MS10, ABC burst time is loaded into the delay timer 140, and a TIMESUP value is loaded into the sector timer 142, for reasons explained immediately below.

If the master state machine 138 misses detecting a servo address mark, the sector timer 142 keeps counting until it reaches the TIMESUP timeout count value loaded in the transition between error state MS16 and state MS10. When the TIMESUP value is reached, the sector timer 142 signals the master state machine via SETTIMESUP that a timeout has occurred. Thereupon, the master state machine transitions to state MS10 from the master state error state MS16; and, the sector timer is reloaded with a new TIMESUP reload count value. The reload count value is a nominal count value which would have otherwise been reached by the sector timer 142 at the time the master state machine 138 has reached its state MS10 had a sector address mark been properly detected. This procedure essentially enables the master state machine to recover from the error state 16 and continue to function at state MS10.

This arrangement means that if the servo circuit 130 becomes lost at any point throughout states MS3 through MS8, (which relate to decoding the sync field 42, servo address mark field 44, index field 46, and track number field 48) the servo will still attempt to read the A, B and C bursts, and thereby obtain centering values for centering the actuator over a particular track location centerline, so that at the next or a subsequent sector, there will be less likelihood that an error condition will result. Also, during settling at the end of a seek, the servo will know from prior samples its general vicinity, and the edge servo system described in the referenced U.S. Pat. No. 5,170,299 will provide digital information relating to absolute track position digital information to the microcontroller, making up for the loss of track identification information due to the error condition in the present sector.

The delay timer 140 loads from four different registers: DLYTOBC; AGCON; DLYTOA; and ABCON.

DLYTOBC is a delay to burst delay register which contains the delay between burst gate signals used to sample the servo pattern A, B and C bursts. The delay is used twice for each servo sector 38. It is first used at the end of the A burst sample to set the delay until the B burst sample begins, and it is then used at the end of the B burst sample to set the delay until the C burst sample. The delay is measured in basic clock periods T (62.5 ns per count). The value is loaded into an up counter that halts at 0FFH. Thus, writing a value of 0FFH would produce a one count or 62.5 nanosecond delay.

AGCON is a servo AGC fast mode time register which determines the length of time the read/write channel 114 is held in an AGC fast acquire mode before the servo sector information is read. Because of the zoned data recording scheme, the user data and the servo data may be at different amplitudes, and the AGC must reacquire a correct gain for each servo sector. After elapse of the time held in AGCON, the AGC circuit 121 is placed in a hold mode, and the servo circuit 130 starts looking for the servo sync pattern. This time interval is also loaded as per DLYTOBC discussed above.

DLYTOA is an A burst delay time register which contains the delay from the last bit of the track number field to the time that the sample gate of the peak detector 160 opens to sample and acquire A burst amplitude. This delay is measured in T, and is loaded per DLYTOBC, discussed above.

ABCON is an A,B,C burst sample time register which contains the length of time each of the burst sample gates of the peak detector 160 are open. This time is measured in T, and is loaded per DLYTOBC, discussed above.

Two eight bit registers of those associated with the sector timer 142 include SAMTOSAMLO and SAMTOSAMHI. SAMTOSAMLO contains the lower eight bits of the time between the presently detected servo address mark and the previously detected servo address mark. SAMTOSAMHI contains the upper four bits of this time interval. As noted, the sector timer 142 is reset upon detection of each sector address mark, and it therefore measures the time interval between servo sectors 38. The counters associated with the sector timer operate at a T/2 rate. With a twelve bit time word, the maximum servo sector period clocked by the sector timer is 510 microseconds, in this particular example.

SYNC AND 14 T PATTERN DETECTOR 134

As previously noted in conjunction with FIG. 3, the sync and 14 T pattern detector 134 performs two discrete functions: sync detect, and 14 T detect. In performing the sync detect function, the detector 134 monitors incoming data from the synchronizer on the synchronized data-input line DIN in order to detect a 3 T pattern. It is important to note that the AGC field 40 and the servo sync field 42 comprise two contiguous, identical patterns nominally of 3 T. Because of spindle motor variations and tolerances within the disk drive subsystem, the delineation between the AGC, field 40 and the servo sync field 42 is subject to timing variations, perhaps as much as 500 nanoseconds (plus or minus 8 T). Accordingly, the sync and 14 T detector is enabled during the transition from master state MS2 to master state MS3. Thereafter, whenever three consecutive 3 T patterns, plus or minus one T pattern, are detected, the logical condition SYNC DETECT is put out by the SSAM detector 134, and the master state machine progresses from master state MS3 to master state MS4.

After the sync pattern has been detected and the master state machine has advanced to its state MS4, the detector 134 functions as a 14 T detector, meaning that after detecting a first flux transition, or "one", it looks for an unbroken string of either 12, 13 or 14 T periods of no flux transition or "zeros". Nominally, the pattern is 13 T without flux transitions. However, since the SSAM detector 134 is operating asynchronously with incoming data (no phase locked loop), a plus or minus one T tolerance is advantageously provided to accommodate resultant bit asynchronicity.

Figure 7:
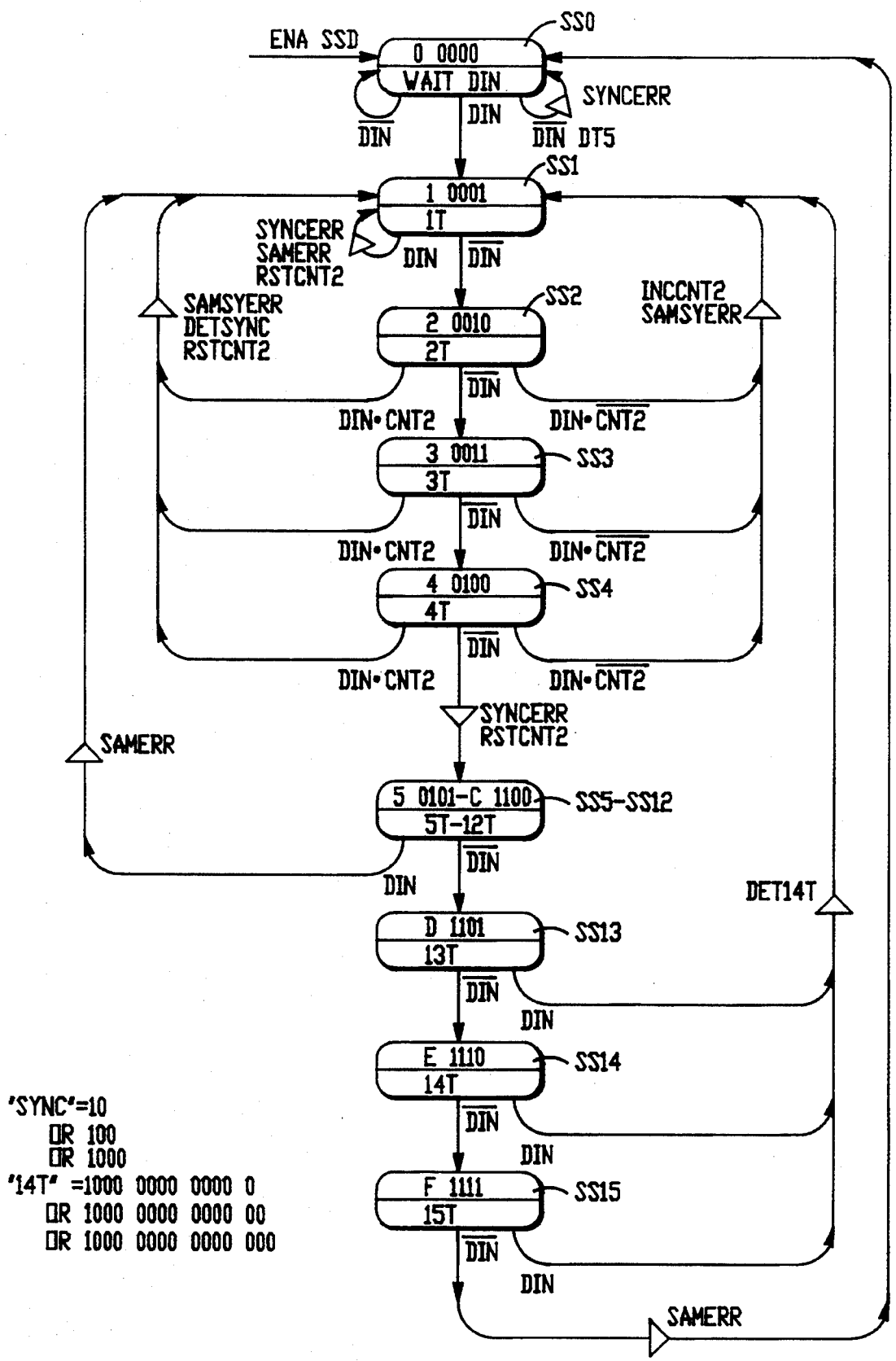
FIG. 7 is a state diagram of servo sync and 14 T pattern detector state machine of the FIG. 4 circuit.

FIG. 7 describes the operational states of the sync and servo address mark detector 134. The first state, state SS0, is really a wait state in which the sync and 14 T pattern detector 134 waits for an incoming transition, denoting a one or DIN true. The detector 134 simply loops for a fixed time period, such as 32 T cells. If no flux transition is detected within this loop period, a sync error is signalled to the master state machine. If a flux transition is detected within this loop interval, DIN becomes true, signifying that the first one has arrived. At this point a transition is made to the next state, state SS1. If during state SS1, the next T or "T1", a one arrives, meaning that there are two adjacent flux transitions, an error condition flag SYNC ERROR is set, a three position counter COUNT2 counting valid 3 T cell patterns is reset, and a branch is made. If the T1 state is a zero, meaning that no flux transition is detected, a transition is made to the next state, state SS2.

In state SS2, or T2, a one is detected, and the COUNT 2 counter is not true, a branch is made to state SS1, and during the transition of the branch, the counter is incremented. Assuming the next T is a zero, state SS1 is left and state SS2 is reached. At this point the COUNT2 counter is still false, and if a one is received at state SS2 for the second time, the same loop back is made, and the counter is again incremented. This time, the COUNT2 counter has reached its count of 2 and is true. Thus, if a zero is received at state SS1, state SS2 is reached again, and if a one is detected at T2, a loop back to state SS1 is made. This time, since there have been three passes through states SS1 and SS2, and the pattern 1010101 has been detected, the sync and 14 T pattern detector 134 asserts SYNC DETECT as true, and the master state machine 138 advances from master state MS3 to master state MS4.

If zeros are received at state SS2, T2, then the SSAM detector 134 advances to its state SS3, which has the same two loop back paths as have been described for state SS2. With state SS3 being operative during sync detection, a pattern of 1001001001 will be detected and will result in assertion of SYNC DETECT as true.

If zeros are received at state SS3, then a transition is made to state SS4 by the SSAM detector 134. At state SS4, ones could be detected at T4, and a resultant pattern of 1000100010001 would result in assertion of the SYNC DETECT as true. If a zero is received at state SS4, a transition is made to state SS5, during which the COUNT2 counter is reset, and SYNC ERROR is asserted true by the SSAM detector 134.

Thus, the sync detection function is operative to detect the nominal 3 T sync pattern which is found in both the AGO, field and in the sync detect field, despite speed tolerance variations, and with a further tolerance for plus or minus one T period, i.e., a 2 T, 3 T or a 4 T recurrent pattern. When such patterns, or any combination thereof, recur three times, SYNC DETECT is asserted true by the SSAM detector 134.

The other function performed by the SSAM detector 134 is to detect the nominal 14 T pattern which is found in the servo address mark field. (Actually, the double occurrence of the 14 T pattern without error is detected by the master state machine, by virtue of its states 4 and 5 (FIG. 6)). In order to detect 14 T, meaning a flux transition T cell, followed by 12, 13 or 14 non-flux transition T cells, the 14 T pattern detector 134 includes states SS5 through SS15. The single node marked "states SS5 through SS12" is actually a number of consecutive cell states for T5, T6, T7, T8, T9, T10, T11 and T12. If, during any one of these one-cell states a one is received, an error condition is detected, and a branch to state SS1 is made. During the branch transition, the SAM ERROR flag is asserted true.

Assuming that no ones are detected during states SS5 through SS12 (meaning a one followed by eleven zero T cells), state SS13 is reached at T cell 13. If a one is detected at state SS13, a branch to state 1 is made, and 14 T DETECT is asserted true during the branch. If a zero is detected at state SS13, state SS14 is reached. State SS14 corresponds to the 14th T cell of the sequence, and if a 1 is decoded at this state, a branch to state SS1 is made, and 14 T DETECT is asserted true during the branch. If a zero is decoded at state SS14, a transition is made to state SS15, the final state of the 14 T detector 134. In state SS15 if a 1 is decoded, a branch to state SS1 is made, and 14 T DETECT is asserted true during the branch transition. If a zero is detected at state SS15, a branch is made to state SS0, and during the branch transition, an error flag, SAMERROR, is asserted true.

DATA READER 136

Figure 8:
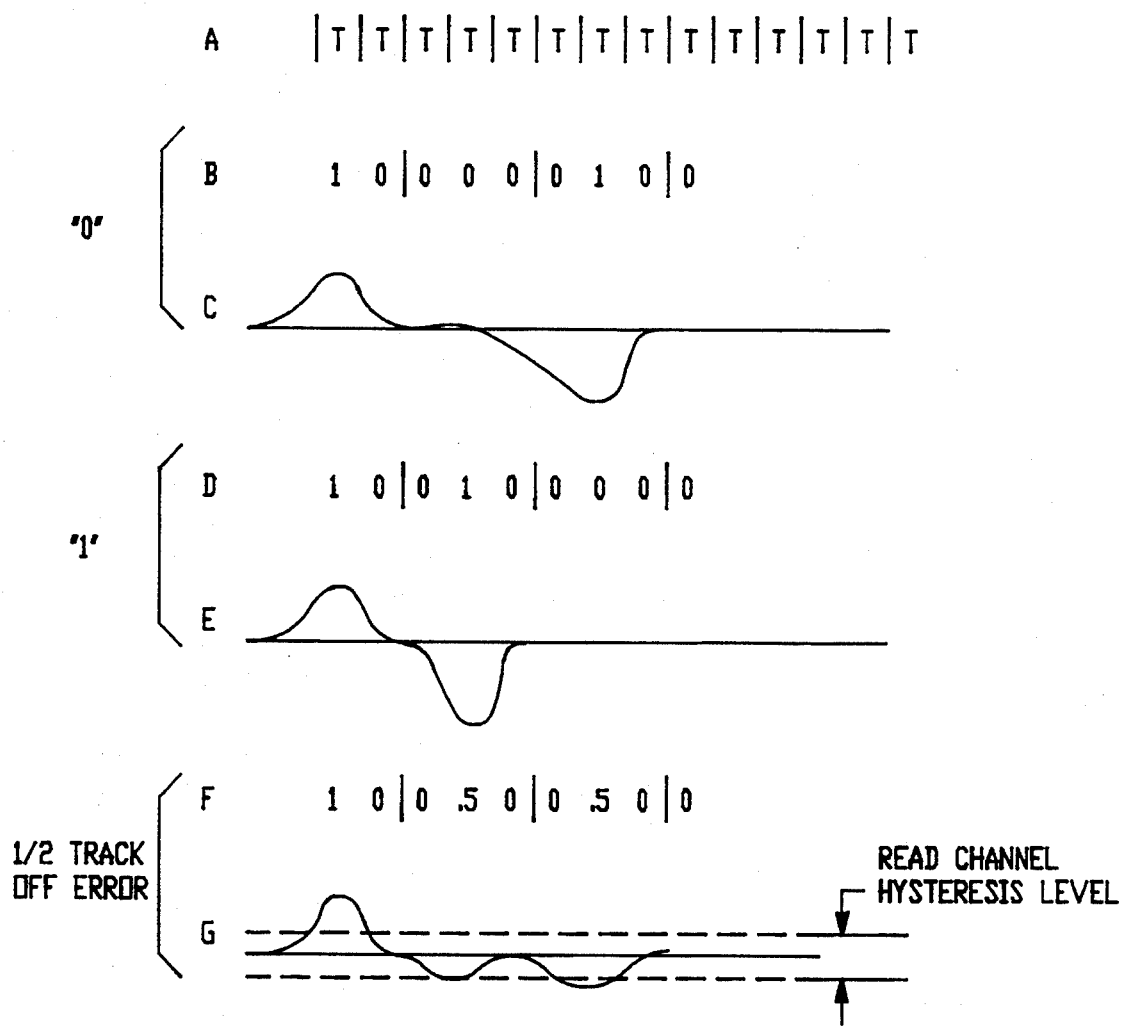
FIG. 8 is a series of waveform graphs of flux transitions illustrating "zero" and "one" data patterns, and an indefinite pattern which may be read between tracks by the data head.

As noted above, the data reader 136 operates to recover the data values contained within the Gray coded track number field 48 (FIG. 2). The servo data bit pattern for a zero binary data bit value is 10:000:010:0; and the servo data bit pattern for a one binary data bit value is 10:010:000:0. These patterns are shown in FIG. 8 which illustrates in graph A the clocking periods T, and which illustrates the "0" pattern in graphs B and C, the "1" pattern in graphs D and E, and a half-off-track or soft error condition in graphs F and G. While the flux transitions depicted in graphs C, E and G are depicted as being fairly sharp and distinguishable, in practice, and particularly during conditions of degraded read channel bandwidth from whatever cause, the flux pairs may more nearly approach sine waves. Noise also provides an important consideration. Obviously, there must be enough space between successive flux transitions for the read channel to differentiate them. The FIG. 5 raw data synchronizer 132 has proven quite reliable in synchronizing the incoming raw flux transitions to the internal clock T.

It is important to note that the first occurring flux transition is at approximately the same location in time and is of the same polarity or sense for each of the three data pattern conditions illustrated in FIG. 8. This first or sync transition enables the data reader to recover the servo sector data bits comprising end of sector address mark, index bit, and the multi-bit track number in a very reliable fashion. This method, while requiring nine clock periods (three triplets) per data bit, has proven far more reliable than prior art schemes which used e.g. six clock periods without the sync bit. Triplets are used to obtain reliable data recovery with flux transitions occurring plus or minus one clock cycle. This approach obviates the requirement that a phase locked loop be employed for data recovery, particularly in the preferred disk drive embodiment having data zones and split data fields. The asynchronous clocking of the data reader enables the servo reliably to recover the data track Gray coded number within an error range of only plus or minus one physical track location (in the one-half track off error condition case illustrated in FIG. 8, graphs F and G). For example, the horizontal dashed lines in graph G of FIG. 8 denote the read channel hysteresis characteristics. If the pulse peak PP lies inside of the lower horizontal dashed line in this example, a soft error will occur, since the pulse will not be detected. This condition may be encountered from time to time, particularly during track seeking operations. If the pulse peak PP extends beyond the lower horizontal dashed line in the graph G example, and the other pulse peak is also beyond the lower horizontal dashed line, the first encountered pulse peak will be detected, and the second pulse peak will be ignored.

Figure 9:
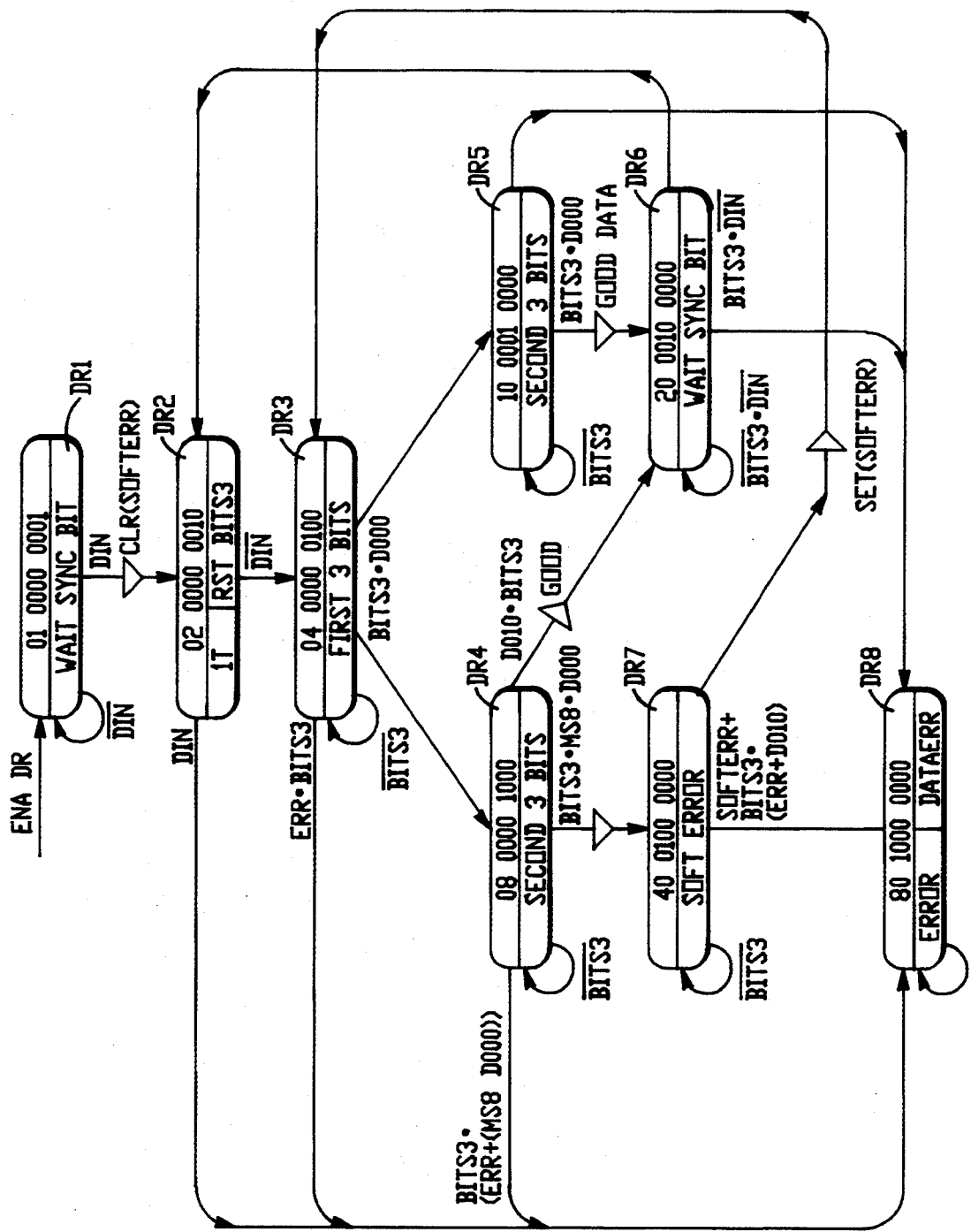
FIG. 9 is a state diagram of a data reader state machine of the FIG. 4 circuit.

Turning now to FIG. 9, the progressive states of the data reader state machine 136 are illustrated. In the presently preferred embodiment, the data reader state machine 136 is armed by the master state machine at the transition occurring between master states MS4 and MS5. Before being enabled, the data reader 136 is forced to state DR1. Once enabled, the data reader 136 loops in state DR1, waiting for the first flux transition (DIN) to arrive. After a maximum number of loops has occurred, an error state is entered, and an appropriate error message is generated.

When the first (sync) flux transition is detected, a transition is made to state DR2. State DR2's function is to check to make sure that the next incoming clock cycle is a zero. In a normal data field, there will never be two ones next to each other. If another flux transition (one) is detected, an error has occurred, and a jump is made to an error state DR8. However, and as expected, if the next clock cycle is a zero or BAR DIN, the data reader 136 progresses to its state DR3.

State DR3 functions to detect the pattern of the first incoming triad of clock pulses. Remembering that for the data field, a servo data "one" bit is a T cell pattern of 10 010 000, and a servo data "zero" bit is a T cell pattern of 10 000 010, state DR3 functions to determine the pattern of the first triad of clock cycles following the sync pulse pair. The first triad (and the subsequent triad as well) may represent any one of eight possible data patterns. Each clock cycle is represented by a capital letter in the following table, with A being the first clock cycle, B being the next clock cycle, and C being the third clock cycle of the triad being detected.

TABLE 1

| A | B | C | Output |
|---|---|---|--------|
| 0 | 0 | 0 | D000 (One part of data bit pattern) |
| 0 | 0 | 1 | D010 (Other part of data bit pattern) |
| 0 | 1 | 0 | D010 (Other part of data bit pattern) |
| 0 | 1 | 1 | Error |
| 1 | 0 | 0 | D010 (Other part of data bit pattern) |
| 1 | 0 | 1 | Error |
| 1 | 1 | 0 | Error |
| 1 | 1 | 1 | Error |

From Table 1 it is apparent that one data condition is the detection of three zeros or D000. In this event, the data reader 135 senses that the first triad is appropriate for a data "zero" and progresses from state DR3 to state DR4. Another data condition is the detection of a one and two zeros. There are three possible patterns which show the tolerance of the data reader to flux transition shifts that may be due to system tolerances, such as spindle speed variations. One acceptable pattern is 001, another is 010, and the third is 100. Any one of these patterns will result in detection of condition D010 which is appropriate for a first triad of a data "one", and will cause the data reader to advance from state DR3 to state DR5. Detection of any of the four error conditions, i.e. 011,101, 110 or 111 will cause the data reader to advance to its error state DR8 which signals a data reader error condition at the master state machine error state MS16.

State DR4 also relies upon the three bit counter to gather in and look at the next incoming data triad. Since state DR4 is the expectant data "zero" state, the expected pattern would be one of the three possible single flux transition patterns of 001,010, or 100. If any one of these three possible patterns is detected at state DR4, a sector binary data bit zero is detected and, during a data reader transition to state DR6, an output line DATA leading to the master state machine is driven low, and a data good true value is sent to the master state machine, causing it to latch the first data bit as a "zero" for the particular field being read (end of SAM, index, or data).

Detection of any of the four direct error conditions of Table 1 causes the data reader to progress from state DR4 directly to its error state DR8. Detection of a three zero pattern at state DR4 is nominally an error condition. However, as shown in waveform G of FIG. 8, during seeking when the data head is off track centerline by one half track pitch, what would otherwise be a data flux transition may not be detected by the read channel, depending upon a threshold level of the read channel hysteresis characteristics (as denoted by the two horizontal lines in waveform G of FIG. 8).

If a three zero pattern is detected, and if this bit is the most significant bit of the data field 48, a data value of "zero" is presumed, and a data zero is sent to the master state machine with a data good true control during a transition from state DR4 to a special state DR7. Special state DR7 nominally looks at the next three clock pulses which should be sync, i.e. an 010 pattern. However, since the assumption that got the data reader into its special state DR7 was that the head was one half track displaced from a track centerline, the next triplet should also be three zeros. If so, a soft error flag is set and a return is made to state DR3. If while in state DR7 the data reader actually reads a flux transition pattern, i.e. D010, then the assumption made at state DR3 about being off track by one half pitch is in error and an error condition is signalled. Also, it should be noted that the soft error assumption is made only once per track number field 48 being read in a particular servo sector. If a second soft error condition occurs after a first soft error has occurred, a hard error condition is signalled by progression to error state DR8. Also, the soft error condition is tolerated only with respect to the data field 48; it is not tolerated for the zero data bit position at the end of the sector address mark field 44.

Once the soft error flag is set and a return is made to state DR3 from state DR7, the system microcontroller 152 will poll the soft error flag. If a seek operation is in progress, and because of the Gray coding pattern for identifying tracks, an error of only plus or minus one actual track number will be incurred by the seeking servo, and this slight positional error is easily accommodated. However, during track following, when the data transducer head is expected to be following the track centerline of the selected track, and when a soft error flag is set, reading and writing will be suspended until the head is repositioned onto track centerline. An off track condition could occur, for example, due to a shock or bump force being applied to the head and disk assembly.

If a data pattern of D010 is found at state DR3, indicating the expectancy of a data "one" value, the data reader progresses to state DR5 which looks for the expectant D000 data pattern. If D000 is found at state DR5, the data reader progresses to state DR6, and during the transition signals a data value of "one" and data good true to the master state machine, which latches a one state bit in its data field register. In the event that a triad pattern containing one or more flux transitions is detected at state DR5, an error condition is present and the data reader progresses to its error state DR8.

The function of state DR6 of the data reader is to detect the flux transition of the sync triad. Once the next occurring flux transition, which should be the sync bit of the next data bit of the data field 48, is detected, a return is made to state DR2 which checks to be sure that the next clock cycle (T) is a zero (no flux transition), and the process of decoding the next data bit ensues by progression of the data reader through its various states. No effort is made or needed to "synchronize" the data reader to the incoming data stream, sufficient bit shift tolerance being built into the decoding process to accommodate plus or minus one T clock cycles per transition, thereby accommodating system tolerances, such as spindle speed variations or jitter. Thus, the present invention renders practical an asynchronous and robust embedded servo sector data recovery circuit 130 without requiring phase locking to the incoming data stream. The circuit 130 is particularly useful within disk drives of the described type employing constant spindle velocity, split data field techniques in order to maximize data storage capacity among concentric data tracks of differing circumferential length.

After the last data bit has been decoded by the data reader and delivered to the master state machine, the data reader is left in an idling state until the next data field is reached, and the data reader is again reset by the master state machine. It should be noted that the soft error flag is cleared during the transition between states DR1 and DR2 when the next data field 48 is encountered and the data reader 136 is rearmed by the master state machine 138.

Figure 10:
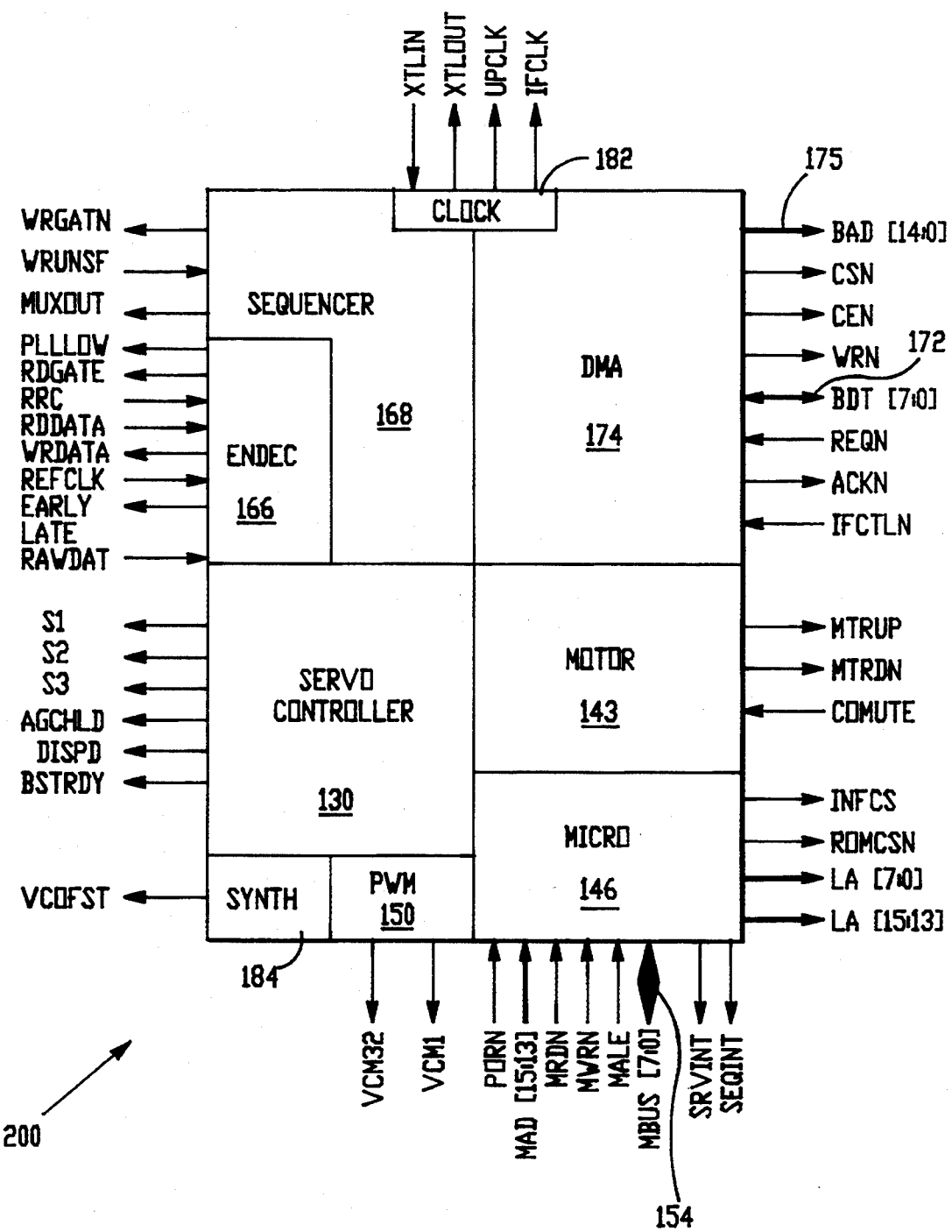
FIG. 10 is a block diagram of a very large scale application-specific integrated circuit (ASIC) including a number of the key functional elements of the disk drive set forth in FIG. 3C.

With reference to FIG. 10, in order to realize a highly compact circuit board for use within a very small form factor, such as a 2.5" diameter disk drive, a single VLSI application-specific integrated circuit 200 is preferably provided which includes e.g. the servo controller circuit 130, the motor controller circuit 143, the microcontroller interface 146, the pulse width modulator 144 which provides driving pulses e.g. to the servo driver circuit 150, the encoder/decoder 166, the data sequencer 168, the buffer memory controller 174, a master system clock 182 controlled by a crystal reference, and a synthesizer controller 184. The following table sets forth a description of the various signal lines shown entering and leaving the circuit 200 in FIG. 10:

| NAME | TYPE | DESCRIPTION |
| --- | --- | --- |
| WRGATN | Out | Write gate out to pulse detector 116 and preamp 115. |
| WRUNSF | In | Write unsafe condition flag. |

-continued

| NAME | TYPE | DESCRIPTION |
| --- | --- | --- |
| MUXOUT | Bi-Dir | Multiplexed test signal |
| PLLLOW | Out | Low Gain command for PLL 126 |
| RDGATE | Out | Read Gate to PLL 126 |
| RRC | IN | Read reference clock from PLL 126 |
| RDDATA | IN | Synchronized read in data from PLL 126 |
| WRDATA | OUT | RZ write data to pre-comp circuit in pulse detector 116 |
| REFCLK | IN | Input from VCO of synthesizer 164 which is used during data writes to disk. |
| EARLY | OUT | Early precomp code to pre-comp circuit in pulse detector 116. |
| LATE | OUT | Late precomp code to pre-comp circuit in pulse detector 116. |
| RAWDAT | IN | Disk raw data read in from pulse detector 116. |
| S[3:1] | Out | S[3:1] control lines for peak detector 160. |
| AGCHLD | Out | AGC hold current gain level control for AGC circuit 121. |
| DISPD | Out | Discharge servo peak detectors in peak detector circuit 160. |
| BSTRDY | Out | Burst Ready--starts analog to digital conversion process at a/d 158. |
| VCOFST | Out | Control from synthesizer control 184 to cause synthesizer 184 to increase its frequency. |
| VCM1 | Out | DAC output for PWM 144 data value "1" weighting value. |
| VCM32 | Out | DAC output for PWM 144 data value "32" weighting value. |
| PORN | In | Power-on reset signal. |
| MAD [15:13] | In | Address bits 15, 14 and 13 for bus 154 |
| MBUS[7:0] | Bi-Dir | Data bits 0-7 of bus 154. |
| MRDN | In | Read strobe for bus 154. |
| MWRN | In | Write strobe for bus 154. |
| MALE | In | Bus 154 address latch enable. |
| SEQINT | Out | Interrupt from sequencer 168 to microcontroller 152. |
| SRVINT | Out | Interrupt from servo circuit 130 to microcontroller 152. |
| LA[15:13] | Out | Latched address output bits 15, 14 and 13 to ROM 156. |
| LA[7:0] | Out | Latched address output bits 7-0 to ROM 156. |
| ROMCSN | Out | Chip select for ROM 156. |
| INFCS | Out | Interface circuit 176 chip select. |
| MTRUP | Out | Motor accelerate up command from motor controller 143 to driver 107. |
| MTRDN | Out | Motor decelerate down command from motor controller 143 to driver 107. |
| COMUTE | In | Commutation signal from driver 107. |
| INFCTL | In | Interface control from interface circuit 176 (loop count zero, or autowrite) |
| REQN | In | Request for data bytes from interface circuit 176. |
| Ackn | Out | Acknowledge receipt of bytes from interface circuit 176. |
| BDT[7:0] | Bi-Dir | Buffer memory data bus 172 to buffer memory 170. |
| BAD[14:0] | Out | Buffer address bus 175 from memory controller 174 to buffer memory 170. |
| CSN | Out | Buffer memory chip select control line. |
| CEN | Out | Buffer memory 170 output enable line. |
| WRN | Out | Buffer memory 170 write enable line. |
| XTLIN | In | 32 MHz crystal Oscillator input. |
| XTLOUT | Out | 32 MHz crystal oscillator output from clock 182. |
| UPCLK | Out | Clock signal to microcontroller 152 (16 MHz nominal). |
| IFCLK | Out | Clock signal to interface circuit 176 (16 MHz or 8 MHz nominal). |

Within the circuit 200 there are a number of internal registers which are directly accessible by the microcontroller 152 via the bus 154 and interface 146. In the following register description, the register symbol is given on the left, followed by a generic description of the register's function, followed by an address over the bus 154 at which the register is located, and finally whether the register is written by the microcontroller 152 (WR) or read by the microcontroller 152 (RD) during the microcontroller's register access operations via the MAD bus 154. The registers that are directly related to the functioning of the servo circuit 130 are as follows:

DLYTOBC: Delay to Burst Delay Register CO (WR)
This register contains the delay between burst gate signals used to sample the servo pattern bursts. The delay is used twice for each servo sector 38. First, it is used at the end of the A burst field 52 to set the delay until the B burst field 56 begins and a B burst sample is taken; and, then it is used at the end of the B burst field sample to set the delay until the C burst field 60 begins and a C burst sample is taken. The delay is counted in T clock periods (T being 62.5 nsec in this example). The value is loaded into an up counter within the circuit 130 that halts at 0FFH. Thus, writing a value of 0FFH produces a one count, or 62.5 nSec. delay.

SAMTOSAMLO: SAM to SAM Timer Register-Lo Byte C0(RD)

SAMTOSAMHI: SAM to SAM Timer Register-Hi Byte C1 (RD)

This register contains the lower eight (8) bits of the time interval between the last servo address mark (SAM) and the previous SAM. The SAM to SAM time register is a 12 bit latch containing the time on the sector counter 142 when a SAM occurs. Because the sector counter 142 is reset on arrival of each detected SAM, it measures the servo sector period. The sector counter 142 counts at the T clocking rate, but the SAM to SAM timer registers—low byte and high byte—do not monitor the least significant bit. The timer 142 thus appears to count at a ½ T rate. Thus, the maximum servo sector period is 510 microseconds. The upper nibble of the high byte register is used to monitor some other signals for test purposes, as follows:

Bit 7, Index
Bit 6, End RW AGC
Bit 5, Start RW AGC
Bit 4, Set Times Up

AGCON: AGC Fast Mode Time Register C1(WR)
This register determines the length of time the Read-/Write channel 115, 116 is held in an AGC fast acquire mode before a servo sector 38. Because the user data and servo data may be at different data transfer rates, and different playback amplitudes, the AGO must reacquire the correct gain for every servo sector 38. After this time, the AGC is placed in hold mode, and the servo circuit 130 starts looking for the 3 T pattern recorded in the Servo AGC time field 40. The time set in this register is measured in T clock periods. The value from the microcontroller 152 is loaded into an up-counter that halts at 0FFH. Thus, writing a value of 0FEH would produce a one count or 62.5 nSec delay.

DLYTOA: Delay to A burst Register C2(WR)
This register contains the delay from the last bit of the track number in the servo pattern track number field 48 at which the A burst sample gate is opened until the A burst field 52 is reached. The delay time is measured in T clock periods. The value is loaded into an up-counter that halts at 0FFH. Thus, writing a value of 0FEH will produce a one count or one T delay.

TRKNUMLO: Track Number Register-LO Byte C2(RD)

TRKNUMHI: Track Number Register-HI Byte C3(RD)

The lower four bits of the track number collected in the master state machine 138 are stored in the upper four positions of the track number low byte register, and the upper eight bytes of the track number are held in the track number high byte register. For ease of use with the servo firmware, the lower bits of the low byte register always read as 1000. This makes the track number appear to change at half track boundaries between tracks. The values held in these registers are not valid while the servo circuit 130 is reading the track number off of the selected data surface. A status flag, Reading Track Number bit, of the TNASTAT Register is thus checked before the track number bits are read from the track number registers. The track number is decoded by the master state machine 18 from a Gray-coded pattern in the track number field 48 which immediately follows the servo address mark field 44. As noted hereinabove, Gray coding of the track number is employed to prevent highly erroneous values from being decoded if the data transducer head 114 is between tracks, which most frequently occurs during seeking. The servo circuit 130 automatically detects and decodes the track number from the track number field 48 for each servo sector 38.

ABCON: A, B, C Burst Sample Time Register C3(WR)
This register contains the length of time in T periods that the burst sample gates are open for sampling and holding amplitude peaks from the burst fields 52, 56 and 60. The value is loaded into an up-counter that halts at 0FFH. Thus, writing a value of 0FEH will produce a one count or one T delay.

TIMESUPLO: Times Up Reload Value Register-LO Byte C4(WR)
TIMESUPHI: Times Up Reload Value Register-HI Byte C5(WR)
These registers contain the lower eight bits and upper four bits of the twelve bit Times-Up reload value. Times-Up is used to keep the sector counter 142 in lock with the servo sector pattern recorded on the disk, even if a read error occurs with regard to servo address mark (SAM). If the sector counter 142 reaches a count equal to the Sector Plus Times-Up (TIMUPTIM) value, the sector counter 142 is reloaded with this Times-Up value.

TNASTAT: Servo Circuit Status Register C4(RD)
The eight bit positions of this register contain status flag bits pertinent to the operation of the servo circuit 130. Each bit position is as follows:
- Bit 7: SAM Error. This bit is set when the hardware fails to detect a proper servo address mark (SAM) at the servo field 44.
- Bit 6: SYNC Error. This bit is set when the servo circuit 130 fails to detect a high frequency (3 T) servo sync pattern from the servo sync field 40 at the start of a servo sector 38.
- Bit 5: DATA Error. This bit is set when the Gray code track number or index bit contains an illegal pattern.
- Bit 4: SOFT Error. This bit is set if the Gray code track number is missing a clock pulse at the beginning of the track number bit cell. This condition may arise as the track number transitions from one track to another track, due to hysteresis in the level qualifier circuit within the pulse detector 116.
- Bit 3: SAM. This bit is set when the servo circuit 130 decodes a valid servo address mark (SAM). This bit will be high until the end of the current servo sector 38, and is cleared at the end of the C burst field 60.
- Bit 2: INDEX. This bit is asserted as soon as the servo circuit 130 detects the index bit from the index field 46 at the beginning of the data number field 48. The bit will be a "1" for the first sector or sector 0, and will be a "0" for all other sectors. The bit will be asserted until the start of the next servo sector 38 as set by the time in the ENDSECTLO and ENDSECTHI registers.
- Bit 1: WEDGE. This bit is set throughout the duration of each servo sector 38. It is asserted when the sector counter reaches the time set in ENDSECTLO and ENDSECTHI registers and is deasserted at STSECT time.
- Bit 0: READING TRACK NUMBER. This bit is set when the servo circuit 130 is reading and decoding the track number. The values in the TRACKNUM registers are changing during this time and the track number is therefore not valid.

SSDTEST: SYNC-SAM-DET/PULSE DET. TEST REG C5(RD)
This register contains eight flag bit positions containing status values for certain functions of the servo circuit and is read by the microcontroller 152 for test purposes.
- Bit 7: Enable Decrement.
- Bit 6: Enable Increment.
- Bit 5: Data In
- Bit 4: SAM Sync Error.
- Bit 3: SAM Error.
- Bit 2: SYNC Error.
- Bit 1: Detect 14 T
- Bit 0: Detect Sync (3 T)

STSECT: Start Sector Time Register C6(WR)
This register contains the time at which the servo sector 38 will end and the data sector or segment 118 will resume. It is at this time that the WEDGE signal is deasserted. Although the sector timer 142 counts at a T rate, this register specifies the time at a T/2 rate. This register specifies only 8 bits of the start sector time, and all higher order bits are understood by the microcontroller 152 as zero.

DRDTTEST: Data Reader/Delay Timer Test Reg. C6(RD)
This register contains bits which monitor internal signals within the servo circuit 130 and are held for test purposes. The bit assignments are:
- Bit 7:DT7
- Bit 6: D T6
- Bit 5: D T5
- Bit 4: Delay Done
- Bit 3: Soft Error
- Bit 2: Data Error
- Bit 1: Good
- Bit 0: Data CONTROL REGISTER: C7(WR/RD)
- Bit 7: AGC Hold Mode. When set, this bit will keep the read/write channel AGC held between servo sectors 38. This mode is asserted during track seeking operations.
- Bit 6: Not used.
- Bit 5: ALT Output Mode. When set, the circuit 130 will change the function of the S1, S2, S3 and AGCHLD pins to be compatible with an alternative version of read channel chip 116 made by Plessy.
- Bit 4: Servo Fault. Setting this bit forces a servo fault to the sequencer. This bit may be used by the firmware when it calculates that the data head ! 14 is off of track centerline. The servo fault will continue until a zero is written to this bit position. The data sequencer 168 also receives a servo fault on all SAM and SYNC errors.

Bit 3: Clear Errors. Writing a "1" to this bit position will clear the following error conditions: SAM Error, Sync Error, Data Error. The clear condition will continue until a zero is written to this bit position.

Bit 2: Seek Mode. This bit position controls the order in which the A, B, C servo bursts are sampled by the peak detector 160. It is desirable to minimize the delay from peak detecting the servo bursts until their amplitudes are converted into digital values by the A/D 158. When this bit position is set, the drive is seeking and quadrature position information (from the A and B burst fields 52 and 56) is needed. Therefore, the bursts are sampled in the order A followed by B followed by C.. When this bit position is cleared, the drive is in a track following mode, and the A and C burst information is needed. Therefore, the bursts are sampled in the order A, C, B.

Bit 1: When set, this bit puts the servo circuit 130 into the "FINDMODE". As explained above, FINDMODE is used when first locking the servo circuit 130 to servo data, such as during a recalibration or power on reset. The FINDMODE may also be invoked in disk drives employing servo data zones, instead of the regularly aligned, constant T servo sectors 38 described herein. Normally, the servo circuit 130 only looks for a servo address mark within a limited time window. This window opens after the data field when the time stored in the ENDSECT registers elapses. If the servo address mark isn't found, the window will close just after the time the last burst (Burst C) should have occurred. When FINDMODE is asserted, the sector timer 142 is ignored, and the search for a servo address mark never ceases.

Bit 0: When set, this bit enables the servo circuit master state machine 138.

SVITIMLO: Servo Interrupt Time Reg-Low Byte C8(WR)

SVITIMHI: Servo Interrupt Time Reg-High Byte C9(WR)

These registers respectively contain the lower eight bits and upper four bits of the servo interrupt time. When the sector timer 142 reaches the time specified by these registers, it asserts a servo interrupt signal which interrupts the microcontroller 152 (providing the interrupt has been enabled). The interrupt signal is held asserted until cleared. The signal is cleared automatically at the end of the servo sector time (start sector time). The signal may also be cleared under microcontroller control by un-enabling the interrupt (by setting the Servo Interrupt Enable bit to zero). The interrupt must be reenabled after it has been force cleared if further interrupts are desired. While the sector timer 142 counts at the T period rate, the time specified in this register is T/2. The high byte register also contains four control signals in the upper nibble.

Bit 7: Enable Delay Timer. This bit position must be asserted for proper operation of the delay timer 140.

Bit 6: Enable Sector Timer. This bit position must be asserted for proper operation of the sector timer 142.

Bit 5: Enable Interrupt. Writing a "1" (asserting) enables interrupts. Clearing this bit position will force the servo interrupt to deassert the servo interrupt signal pin from the circuit 130.

Bit 4: Interrupt Active High. This bit position sets the polarity of the signal output on the Servo Interrupt control line. Writing a "1" to this bit will cause the servo circuit 130 servo interrupt pin to rest in the logical "0" state, and assert to a "1" level after an interrupt.

STTESTLO: Sector Timer Test Reg-LO Byte C8(RD)
STTESTHI: Sector Timer Test Reg-HI Byte C9(RD)

These registers are primarily provided for test purposes, but enable direct reading of the servo sector timer 142 at a T/2 rate (the lowest significant bit of the sector timer being ignored). Because the value of the servo sector timer 142 is always changing, several re-reads of these registers may be necessary. Reading the C8/C9 addresses accesses the same physical register as the SAMTOSAM registers. Reading the sector time is accomplished by forcing the SAMTOSAM latch open. Therefore, reading this register will destroy the values in the SAMTOSAM registers. The upper nibble of the high register provides test flag bits, as follows:

Bit 7: Wedge
Bit 6: End POW AGC
Bit 5: Start POW AGC
Bit 4: Set Times-Up

ENDSECTLO: End Sector Time Reg-LO Byte CA(WR)
ENDSECTHI: End Sector Time Reg-HI Byte CB(WR)

These registers contain respectively the lower eight bits and upper four bits of the time at which the servo control circuit 130 should begin to read and process a servo sector 38 and look for the next servo address mark. Thus, these registers should specify the time that the data sector ends or is interrupted. When the sector timer 142 reaches the time specified by these registers, it asserts the "WEDGE" control signal. It then starts the master state machine 138 which starts its hunt for the servo address mark sequence. While the sector timer 142 clocks at the T clocking rate, the time specified by these registers is T/2.

TIMUPTIMLO: Sector plus TIMESUP Time Reg-Lo Byte CC(WR)
TIMUPTIMHI: Sector plus TIMESUP Time Reg-HI Byte CD(WR)

These registers contain respectively the lower eight bits and the upper four bits of the time at which the servo circuit 130 will cease progressing through its states if it has not decoded a servo address mark. At the time specified by these registers the sector timer 142 is reloaded with the contents of the TIMESUP registers. The TIMESUP registers should be loaded with the value the sector counter would have read at that time, had a servo address mark been detected. This process is used to keep the servo circuit 130 locked onto the servo sectors 38 even in the event of a read error and failure to detect a servo address mark. The value stored in the TIMUPTIM registers is compared against the sector timer which clocks at the T rate, but the present registers' value is compared only to the top twelve bits of the sector time. So, for these registers the time is specified at a T/2 rate.

PWMLO: PWM Output Value Reg-LO Byte CE(WR)
PWMHI: PWM Output Value Reg-HI Byte CF(WR)

These registers contain respectively the lower eight bits, and the upper two bits of actuator position values put out to the servo driver 150 via the PWM circuit 144. The PWM circuit 144 provides an efficient, low cost digital to analog converter which is used to drive the rotary voice coil actuator motor (VCM). A counter running off of a 2 T crystal reference clock is used to construct a variable width, constant frequency pulse train. The width of the pulse is determined by the PWM value held in these registers. Because a ten bit resolution PWM would have a frequency of 2 T/1024, the output would have to be filtered at a very low frequency. Instead, the pulse width modulator circuit 144 is implemented as two 5-bit resolution pulse width modulators. The upper five bits of the PWM output value control the duty cycle of the VCM32 output, and the lower five bits control the duty cycle of the VCM1 output. Both PWMs have a repetition frequency of 2 T/32 or 1 MHz in the example given herein.

VCODIV: VCO Divider Constant Register D0(WR)

The integrated circuit 200 includes the digital hardware needed to implement a synthesizer based off of the crystal clock (32 MHz). This register establishes the divider constant between the external VCO and the digital phase comparator. If the VCO output frequency is m/n times the crystal clock frequency, this register contains the m constant.

REFDIV: Reference Clock Divider Constant Register D1(WR)

This register establishes the divider constant n between the internal crystal clock and the digital phase comparator. This register also contains a bit which will shut down the synthesizer portion of the circuit 200. This control is useful if the synthesizer function is not used, or when operating in the power reduced mode. Bit position 5, when asserted, disables all synthesizer counters and registers.

AGCTIM: AGC Fast Mode after Wedge Timing Reg. D2(WR)

This register controls the AGC fast timing after each servo sector 38. Bit positions 0-4 contain an AGC Fast Off Time; and bit positions 5-7 contain an AGC Fast Start Time. The read/write channel 115/116 must be put in AGC fast mode after a servo sector so that it may quickly reacquire the correct gain for the data sector 118. However, it is important not to place the channel in AGC fast mode over a write splice, or the channel may acquire the wrong gain level. Therefore, considerable flexibility results from use of this register. The values in this register are compared to values held in the sector timer 142 after WEDGE is de-asserted. The AGC value is held from the end of sector (WEDGE) until AGC Fast Start Time. When the AGC Fast Start Time equals the sector timer time, AGC Fast Mode is initiated. When the AGC Fast Off Time matches the sector timer time, the AGC Fast Mode is terminated, and the AGC returns to normal operation. In the event of a tie, AGC Fast Mode is skipped.

The scaling on the two values in this register are different. The AGC Fast Start Time value corresponds to the least significant bits of the sector timer. Because this time is compared against the sector timer directly after the end of the servo sector (WEDGE), and this register does not specify the delay after sector start, the delay from end of sector to AGC Fast Mode is a function of both STSECT and AGC Fast Start Time. Care must be used in choosing values to achieve desired operation. The AGC Fast Off time is compared to bits 5 through 1 of the sector timer. So, this time scales in steps of T/2.

By proper choice of AGC Fast Start Time and AGC Fast Off Time, four scenarios can be created. By setting both constants equal to the STSECT time, the AGC will immediately resume normal operation after the end of sector (WEDGE). By setting AGC Fast Start Time and AGC Fast Off Time to the same value, the AGC value will be held for a period after the end of sector (perhaps to bypass a write splice) and then will resume operation. By setting AGC Fast Start Time equal to STSECT time and delaying out AGC Fast Off Time, there will be a pulse of AGC Fast Mode and then normal operation. Finally, by setting AGC Fast Start Time after STSECT time and delaying out AGC Fast Off Time a little more, the AGC will hold for a duration, followed by AGC Fast Mode for a duration.

TADCTL: Additional Control Register D3(WR)

This register provides for additional control of the servo control circuit 130, on a control bit basis, as follows:

Bit 7: Force Error
Bit 6: Force ENASSD and MS8
Bit 5: Force INDEX. INDEX to sequencer is asserted during each servo sector while this bit is set.
Bit 4: Enable Force LDTOBC.
Bit 3: Reserved
Bit 2: Test Mode. When this bit is set, the lower four bits of the TRACKNUMBLO register (nominally 1000 while in use) will indicate the current state of the master state machine 138.
Bit 1: Power Down Mode. When this bit is set, the clock to the servo circuit master state machine 138 is disabled.
Bit 0: Force TNA POR. Writing a "1" to this bit position will force the servo circuit 130 into a power on reset state.

While all of the connection lines and registers described above are presently preferred, those skilled in the art will appreciate that some or all of the lines and registers may be omitted or changed, with very little drawbacks in certain applications and implementations. Thus, the foregoing description is to be understood as being illustrative of many aspects and features of the present invention, without limiting the scope thereof.

The microfiche appendix accompanying the application leading to this patent sets forth in greater detail electrical circuit schematics for the servo circuit 130 and also control program routines for the microcontroller 152.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. In a disk drive including: a base, a storage disk rotating relative to the base at a predetermined angular velocity and defining a multiplicity of concentric data tracks, each track for storing user data, and a plurality of radially aligned, embedded servo sectors interrupting the data tracks and containing a plurality of servo information fields comprising a servo sync field, a servo address mark field, a binary track number field and plural track centerline correction burst fields, a data transducer head for reading data from the tracks and servo information fields, and for writing data to the tracks, and an electromechanical head positioner means within a head positioner servo loop for controlling the position of the data transducer head during track seeking operations during which the head is moved from a departure track to a destination track, and during track following operations during which the head is maintained in alignment with a selected data track being followed, the head positioner servo loop including:

a servo field decoder including an internal servo timer means and connected to the data transducer head for detecting and decoding said servo sync field, said servo address mark field and said binary track number field, for controlling timing of sampling of signals read from said plural centerline correction burst fields in said servo sector, and for resetting said internal servo timer means upon detection of the said address mark pattern, sample and hold means connected to the data transducer head and controlled by the servo field decoder for sampling and holding amplitudes of the signals read from said centerline correction burst fields, analog to digital conversion means connected to the sample and hold means for converting held amplitudes into digital head position values, and programmed digital processor means connected to the servo field pattern decoder and to the analog to digital conversion means, the servo field pattern decoder comprising a master state machine and a plurality of slave state machines connected to the master state machine and including:

internal clock generator means connected to the internal servo timer means for generating a reference clock signal at a nominal servo sector information data rate, raw data synchronizer means responsive to the reference clock signal for receiving and framing raw servo data pulses read by the data transducer head within periods of the reference clock signal into clock-aligned asynchronous digital servo data in which flux transitions become data aligned with the reference clock within plus or minus one clock interval of the nominal servo sector information data rate, a sync field and servo address mark field slave state machine activated by the master state machine and connected to the internal clock generator means and to the raw data synchronizer means for detecting a plurality of predetermined first digital servo data patterns comprising the sync field and for detecting a plurality of predetermined second digital servo data patterns comprising at least an initial portion of the servo address mark field from the clock-aligned asynchronous digital servo data and for signaling detection of said first and second patterns to the master state machine, a data reader slave state machine activated by the master state machine and connected to the internal clock generator means and to the raw data synchronizer means for detecting from the clock-aligned asynchronous digital servo data third digital servo data patterns comprising track number bits of the track number field and for sending each of the detected track number bits to the master state machine, the servo timer means including a servo sector timer for timing recurrence of each servo sector as timed from detection of a servo address mark in a preceding servo sector, and a delay timer for timing delays associated with arrival and duration of at least one of said servo information fields, and the master state machine being responsive to said servo sector timer means to locate the beginning of each servo sector for activating said sync field and servo address mark field pattern slave state machine, and for subsequently activating said data reader slave state machine upon detection of the plurality of predetermined first and second digital servo data patterns, and being responsive to said delay timer for marking in time said centerline correction burst fields within said servo sector and for controlling the sample and hold means, and for detecting a servo address mark from patterns detected by said sync field and servo address mark field pattern and the data reader slave state machine and for thereupon resetting said servo sector timer means and for accumulating each track number bit of said track number detected by said data reader slave state machine in a track number register and for providing the track number accumulated in the track number register to said programmed digital processor means, the programmed digital processor means including calculation means for calculating head position control values from the track number and from the digital head position value, and digital to analog conversion means connected to the programmed digital processor means for putting out the head position control values as analog driving signals to said electromechanical head positioner means.

2. The head positioner servo loop set forth in claim 1 wherein the third digital servo data pattern comprises plural flux transition timing cell triads, the triads including a sync triad (nominally 010, wherein "1" represents a magnetic flux transition within a servo data timing cell, and "0" represents absence of a magnetic flux transition within the timing cell ) and two data triads: a zero triad (000) and a one triad (nominally 010) defining a single binary track number:data bit, and wherein said data reader slave state machine includes:

first state means for detecting the sync triad, second state means for detecting one of zero triad and one triad, third state means following the second state means for detecting another of one triad following zero triad and for signaling a data bit of a first sense, fourth state means following the second state means for detecting another of zero triad following one triad and for signaling a data bit of a second sense, wherein the first sense represents one of a binary track number data bit zero and one, and the second sense represent the other of a binary track number data bit zero and one.

3. The head positioner servo loop set forth in claim 2 wherein each said binary track number data bit is decoded by the data reader slave state machine in accordance with the following pattern: wherein a "1" in a cell position A, B, C represents presence of a detected flux transition and wherein a "0" in a cell position A, B, C represents absence of a detected flux transition, within a second or third triad:

| A | B | C | Output |
|---|---|---|---|
| 0 | 0 | 0 | D000 (SECOND OR THIRD TRIAD) |
| 0 | 0 | 1 | D010 (THIRD OR SECOND TRIAD) |
| 0 | 1 | 0 | D010 (THIRD OR SECOND TRIAD) |
| 0 | 1 | 1 | Error |
| 1 | 0 | 0 | D010 (THIRD OR SECOND TRIAD) |
| 1 | 0 | 1 | Error |
| 1 | 1 | 0 | Error |
| 1 | 1 | 1 | Error. |

4. The head positioner servo loop set forth in claim 3 wherein a binary data bit one pattern decoded by said data reader slave state machine comprises 010 010 000 and wherein a binary data bit zero pattern decoded by said data reader slave state machine comprises 010 000 010.

5. The head positioner servo loop set forth in claim 2 wherein the data reader slave state machine includes fifth state means responsive to at least one of the first, second, third and fourth state means for receiving pattern errors and for signaling a received pattern error condition to said master state machine.

6. The head positioner servo loop set forth in claim 5 wherein the data reader slave state machine comprises a sixth state means responsive to initial reception within a servo sector interval of two zero triads as said second and third triads and for signaling a soft error to the master state machine, at least during track seeking operations.

7. The head positioner servo loop set forth in claim 6 wherein the sixth state means of the data reader slave state machine communicates a received pattern error condition to said fifth state means thereof upon detection of a subsequent reception within said servo sector interval of two zero triads as said second and third triads.

8. The head positioner servo loop set forth in claim 6 wherein the data reader slave state machine comprises seventh state means responsive to said third and fourth state means for detecting a next arrival of a sync triad and for thereupon returning servo data flow to said second state means.

9. The head positioner servo loop set forth in claim 1 wherein the servo field decoder includes missed servo address mark recovery means responsive to detection of pattern errors by one of the sync field and servo address mark field slave state machine and the data reader slave state machine for marking in time said centerline correction burst fields from a said servo sector even though one of said sync field pattern, said servo address mark field and said data track number field is not successfully decoded, and for enabling the sample and hold means to sample and hold amplitudes read from said centerline correction burst fields of said servo sector.

10. The head positioner servo loop set forth in claim 1 wherein the delay timer is programmable and includes register means for holding a digital delay value corresponding to a programmable delay interval between adjacent ones of the plural track centerline burst fields, and includes a delay counter means responsive to the digital delay value for marking in time the programmable delay interval between adjacent ones of the plural track centerline burst fields.

11. The head positioner servo loop set forth in claim 1 wherein the servo timer means includes first register means for holding a digital value corresponding to a programmable time interval between arrival at the data transducer head of servo address mark fields of adjacent servo sectors, and sector-counter means responsive to the digital value for counting to the digital value corresponding to the programmable time interval held in the first register means, thereby marking in time an expected arrival of a a next adjacent servo sector.

12. The head positioner servo loop set forth in claim 11 wherein the servo field decoder includes second register means for holding a digital value corresponding to a programmable servo sector starting count for marking in time an expected beginning of a next servo sector, the master state machine being responsive to the servo sector counter means and to the second register means in order to activate the sync field and servo address mark field slave state machine to begin searching for first and second digital servo data patterns in said next servo sector.

13. The head positioner servo loop set forth in claim 12 wherein the servo field decoder includes third register means for holding a digital value corresponding to a programmable servo sector ending count for marking in time an expected end of a present servo sector, the servo field pattern decoder being responsive to the servo sector counter and to the third register means in order to generate and put out a signal marking a beginning of a user data segment following the present servo sector.

14. The head positioner servo loop set forth in claim 1 wherein the servo timer means includes sample register means for holding a digital value corresponding to a programmable duration during which the sample and hold means samples a said centerline correction burst field, the servo timer means being responsive to the value.

15. The head positioner servo loop set forth in claim 1 wherein the servo sector timer includes sector counter means for counting intervals between locations of servo address mark patterns of adjacent servo sectors, and first register means for holding a digital value corresponding to a programmable maximum sector interval, and second register means for holding a digital value corresponding to a count value the sector counter means would have reached when a servo address mark field of a following servo sector of the adjacent servo sectors would have been decoded, and logic means responsive to the sector counter means, the first register means, and second register means, for reloading the sector counter means with the value held in the second register means when the count reached by the sector counter means equals the value held in the first register means.

16. The head positioner servo loop set forth in claim 1 wherein index servo sector at an index location of the storage disk includes an index pattern located between the servo address mark pattern and the binary track number pattern which is different than the index pattern of servo sectors other than the index servo sector, and wherein the master state machine activates the data reader slave state machine for detecting the index pattern, and for signaling detection of each index pattern to the master state machine whereupon the master state machine generates and puts out an index pulse to the programmed digital processor means.

17. The head positioner servo loop set forth in claim 16 wherein the disk drive includes a speed regulation circuit for controlling a disk spindle motor, the speed regulation circuit for receiving and comparing a motor clock signal in synchronism with the reference clock signal with the index pulse put out by the master state machine for slowing down and speeding up the disk spindle motor in order to achieve and maintained the predetermined angular velocity of data storage disk rotation.

18. The head positioner servo loop set forth in claim 1 wherein the master state machine includes a find mode means for rapid location of a servo sector and restarting the servo sector timer, wherein following activation the sync field and servo address mark field pattern slave state machine generates error conditions upon failure to detect a sync field pattern or a servo address mark field pattern, wherein following activation the data reader slave state machine generates error conditions upon failure to detect the plural data patterns comprising the track number bits, and wherein the find mode means is responsive to one of the error conditions of the sync field and servo address mark field pattern slave state machine and to the data reader slave state machine during operation of the find mode means for causing the sync field and servo address mark field pattern slave state machine to restart a search for a sync field pattern without delay.

19. A servo field pattern decoder for decoding a servo sector pattern read by a data transducer head from a magnetic data storage medium manifesting jitter relative to the data transducer head, the servo sector pattern being embedded within at least one data track having data fields recorded at a data rate different than a servo data rate of the servo sector pattern, and including a plurality of servo sector fields, and comprising a master state machine and a plurality of slave state machines connected to the master state machine and operating without phase lock to the servo sector pattern, the servo field pattern decoder including:

internal clock generator means for generating a reference servo clock signal related to the servo data rate, raw data synchronizer means responsive to the reference servo clock signal for receiving raw servo data pulses read from the recorded magnetic servo sector pattern and framing the raw servo data pulses into clock-aligned asynchronous digital servo data in which magnetic flux transitions of the pattern are aligned with the reference servo clock signal within plus or minus one clock cycle, a sync field and servo address mark field pattern slave state machine activated by the master state machine and connected to the internal clock generator means and to the raw data synchronizer means for detecting a plurality of predetermined first servo data patterns comprising a sync field and for detecting a plurality of predetermined second patterns comprising at least a portion of a servo address mark field from the clock-aligned asynchronous digital servo data and for signaling detection of said first and second patterns to the master state machine, a data reader slave state machine activated by the master state machine and connected to the internal clock generator means and to the raw data synchronizer means for detecting from the clock-aligned asynchronous digital servo data each one of a plurality of third data patterns comprising track number bits of a track number field and for sending each of the detected track number bits to the master state machine, a servo timer means including a servo sector timer for timing recurrence of each servo sector as timed from detection of a servo sector servo address mark in a preceding servo sector, the master state machine being responsive to said servo timer means at the beginning of each servo sector for activating said sync field and servo address mark field pattern slave state machine, and for subsequently activating said data reader slave state machine upon detection of the plurality of predetermined second servo data patterns, for detecting a servo address mark including said detected second patterns and for thereupon resetting and restarting said servo sector timer, and for framing the track number bits detected by said data reader slave state machine into a digital track number corresponding to the track including the servo sector pattern.

20. The servo field pattern decoder set forth in claim 19 wherein said servo address mark comprises a combination of a plurality of second servo data patterns detected by the sync field and servo address mark field slave state machine followed by at least an initial third data pattern detected by the data reader slave state machine and wherein the data reader slave state machine signals detection of the initial third data pattern to the master state machine which thereupon detects said servo address mark.

21. The servo field pattern decoder set forth in claim 19 wherein an index servo sector pattern at an index location of the magnetic storage medium includes an index field having an index pattern comprising a third data pattern which is different than an index pattern of an index field within servo sectors other than the one servo 'sector, and wherein the master state machine activates the data reader slave state machine for detecting the index pattern as a third data pattern, and for signaling detection of each index pattern to the master state machine, wherein the master state machine generates and puts out an index pulse upon receipt of the detection signal of the index pattern.

* * * * *